(12) United States Patent
Uematsu et al.

(10) Patent No.: US 11,932,248 B2
(45) Date of Patent: Mar. 19, 2024

(54) VEHICLE CONTROL APPARATUS

(71) Applicant: DENSO CORPORATION, Kariya (JP)

(72) Inventors: Takumi Uematsu, Kariya (JP); Mitsuhiro Tokimasa, Kariya (JP); Michihiro Kuroki, Kariya (JP)

(73) Assignee: DENSO CORPORATION, Kariya (JP)

( * ) Notice: Subject to any disclaimer, the term of this patent is extended or adjusted under 35 U.S.C. 154(b) by 510 days.

(21) Appl. No.: 17/129,802

(22) Filed: Dec. 21, 2020

(65) Prior Publication Data

US 2021/0107482 A1 Apr. 15, 2021

Related U.S. Application Data

(63) Continuation of application No. PCT/JP2019/024493, filed on Jun. 20, 2019.

(30) Foreign Application Priority Data

Jun. 22, 2018 (JP) .................................. 2018-118951

(51) Int. Cl.
*B60W 30/16* (2020.01)
*B60W 60/00* (2020.01)

(52) U.S. Cl.
CPC ...... *B60W 30/16* (2013.01); *B60W 60/00274* (2020.02); *B60W 2552/10* (2020.02); *B60W 2554/4041* (2020.02)

(58) Field of Classification Search
None
See application file for complete search history.

(56) References Cited

U.S. PATENT DOCUMENTS

| | | | |
|---|---|---|---|
| 2005/0090950 A1 | 4/2005 | Sawamoto et al. | |
| 2009/0248270 A1* | 10/2009 | Sekiguchi | B60W 10/06 701/96 |
| 2015/0166062 A1* | 6/2015 | Johnson | G08G 1/167 701/41 |
| 2016/0339914 A1* | 11/2016 | Habu | B60W 30/165 |
| 2017/0305422 A1* | 10/2017 | Ito | B60W 50/0097 |

(Continued)

FOREIGN PATENT DOCUMENTS

| | | |
|---|---|---|
| JP | 2003-200754 A | 7/2003 |
| JP | 2005-100336 A | 4/2005 |
| JP | 2008-117073 A | 5/2008 |

*Primary Examiner* — David P. Merlino
(74) *Attorney, Agent, or Firm* — MASCHOFF BRENNAN

(57) ABSTRACT

A vehicle control apparatus performs a following travel mode in which an own vehicle travels while following a followed vehicle ahead of the own vehicle. The apparatus includes a surrounding object detection section that acquires detection information regarding a surrounding object, a space determination section that uses the detection information to determine presence/absence of a free space located laterally to an own lane, a setting condition determination section that determines whether a first other vehicle having entered the own lane from the free space or a second other vehicle traveling ahead of a preceding vehicle having entered the free space from the own lane meets a setting condition for setting the first or second other vehicle as the followed vehicle, and an automated driving control section that sets the first or second other vehicle as the followed vehicle to perform the following travel mode if the setting condition is met.

10 Claims, 35 Drawing Sheets

(56) References Cited

U.S. PATENT DOCUMENTS

2017/0361841 A1* 12/2017 Kojo ................ B60W 30/0956
2018/0001894 A1    1/2018 Masui et al.
2018/0079422 A1*  3/2018 Weinstein-Raun .... G08G 1/127

* cited by examiner

FIG.28
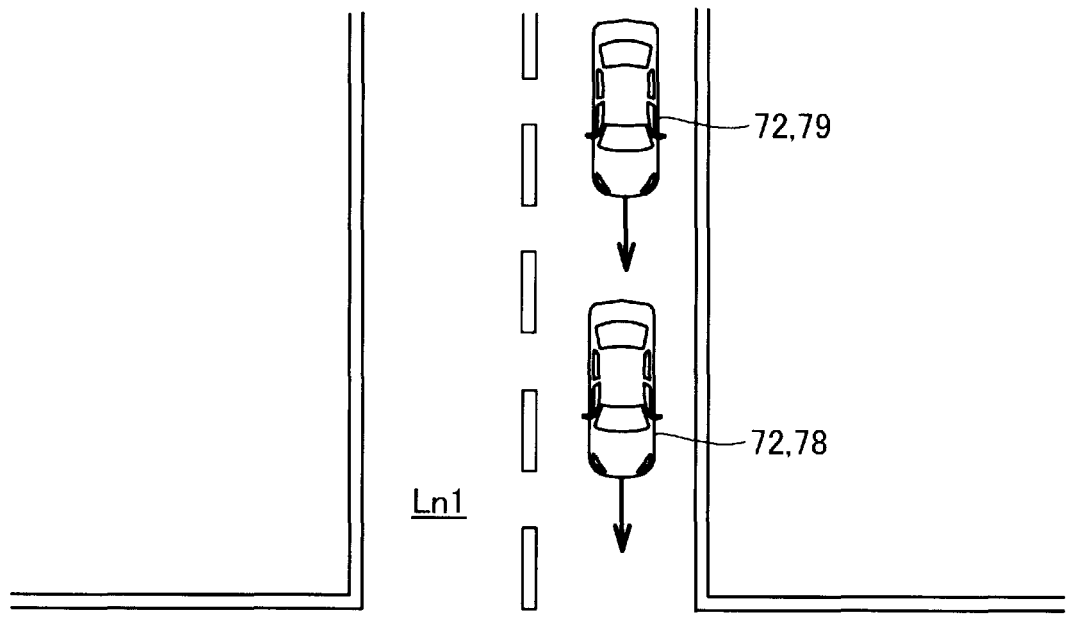
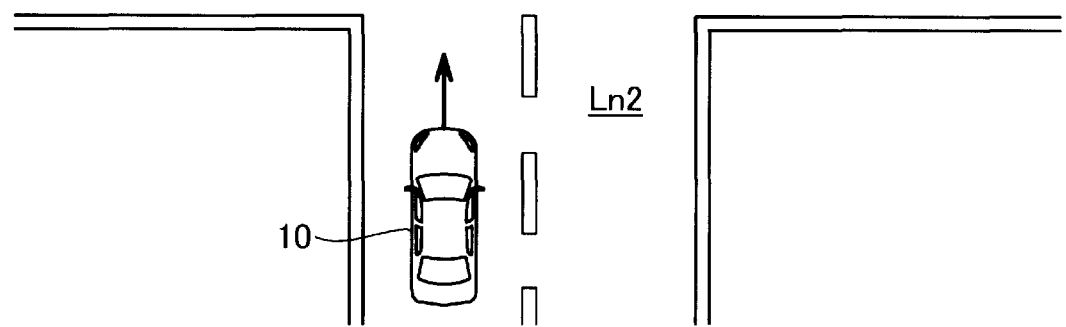

VEHICLE CONTROL APPARATUS

CROSS-REFERENCE TO RELATED APPLICATION

The present application is based on and claims the benefit of priority from earlier Japanese Patent Application No. 2018-118951 filed on Jun. 22, 2018, the description of which is incorporated herein by reference.

BACKGROUND

Technical Field

The present disclosure relates to a technique for controlling driving of an own vehicle.

Related Art

In a known technique for causing an own vehicle follow a preceding vehicle, lane markings dividing a driving lane (own lane) of the own vehicle is recognized, and a cut-in vehicle that cuts in the own lane from an adjacent lane is determined based on a relative position of a forward vehicle in the vehicle width direction with reference to the recognized lane markings. In addition, a departure vehicle that departs from own lane is determined based on the relative position.

SUMMARY

As an aspect of the present disclosure, a vehicle control apparatus is provided which performs a following travel mode in which an own vehicle is caused to travel while following a vehicle to be followed located in front of the own vehicle. The vehicle control apparatus includes: a surrounding object detection section that acquires detection information regarding a surrounding object located around the own vehicle; a space determination section that uses the detection information acquired by the surrounding object detection section to determine presence or absence of a free space, in which a vehicle is allowed to travel, located laterally to an own lane in which the own vehicle travels; a setting condition determination section that determines whether a first other vehicle that is another vehicle and has entered the own lane from the free space or a second other vehicle that is the another vehicle and travels, in the own vehicle, in front of a preceding vehicle that has entered the free space from the own lane meets a setting condition for setting the first other vehicle or the second other vehicle as the vehicle to be followed; and an automated driving control section that sets the another vehicle as the vehicle to be followed to perform the following travel mode if the setting condition determination section determines that the setting condition is met.

BRIEF DESCRIPTION OF THE DRAWINGS

In the accompanying drawings:

FIG. 28 is a diagram for illustrating entry oncoming vehicles;

DETAILED DESCRIPTION OF THE PREFERRED EMBODIMENTS

Figure 1:
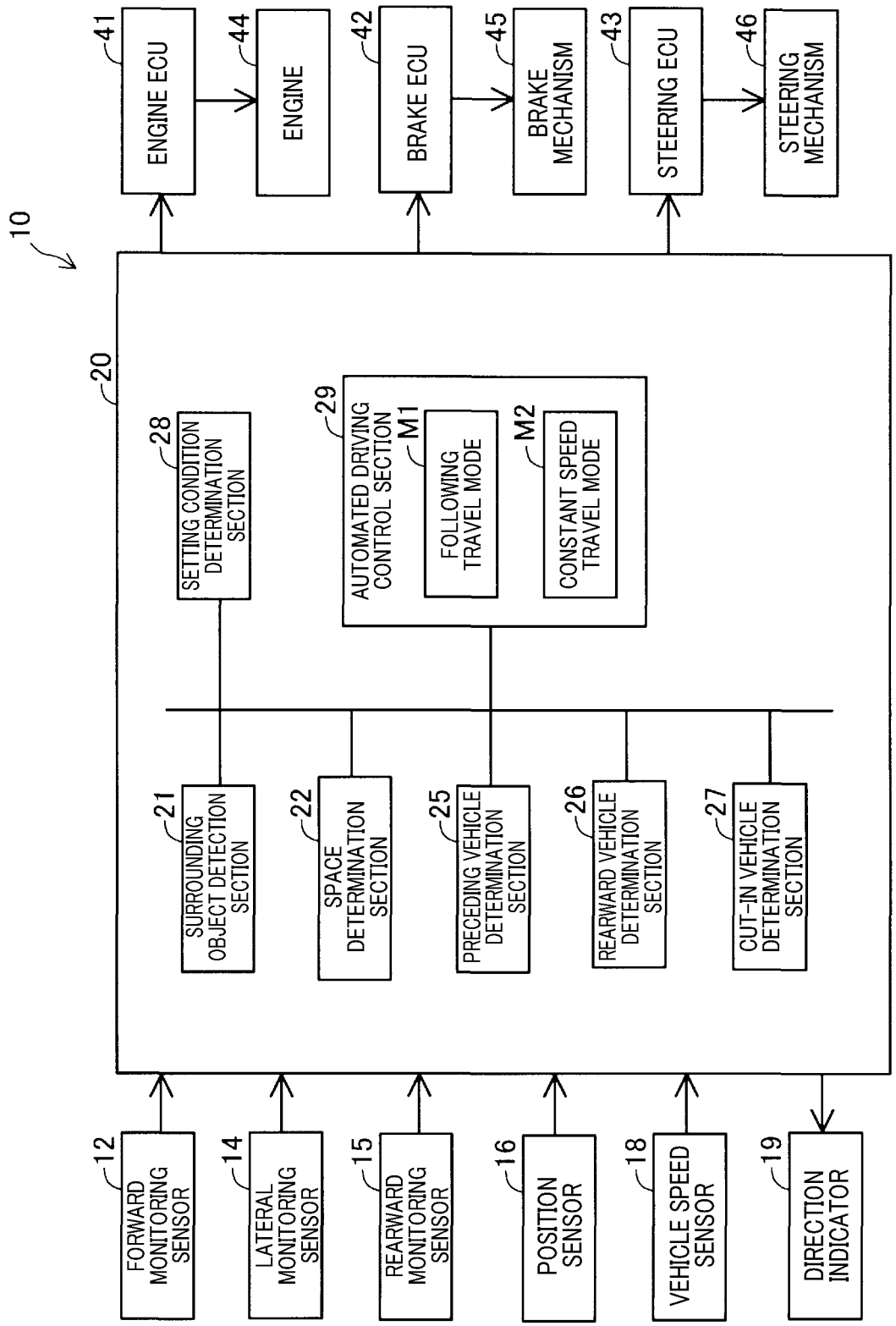
FIG. 1 is a block diagram of an own vehicle including a vehicle control apparatus according to a first embodiment.

In a known technique for causing an own vehicle follow a preceding vehicle, lane markings dividing a driving lane (own lane) of the own vehicle is recognized, and a cut-in vehicle that cuts in the own lane from an adjacent lane is determined based on a relative position of a forward vehicle in the vehicle width direction with reference to the recognized lane markings (JP-A-2016-134093). In addition, a departure vehicle that departs from own lane is determined based on the relative position.

In the above technique, it is determined whether or not a vehicle which travels in the own lane or the adjacent lane and whose traveling direction is the same as that of the own vehicle is a cut-in vehicle or a departure vehicle to select or not select a vehicle to be followed by the own vehicle. However, the above technique does not consider to determine whether or not a vehicle whose traveling direction is different from that of the own vehicle is a cut-in vehicle or a departure vehicle. The vehicle whose traveling direction is different from that of the own vehicle may appear when a free space such as a lane intersecting the own lane is present. Hence, a technique is desired which is for smoothly control an own vehicle so as to follow an other vehicle when the other vehicle is required to be set as a vehicle to be followed due to the presence of a free space intersecting the own lane.

A. FIRST EMBODIMENT

In the present embodiment, a vehicle control apparatus 20 used in an area where vehicles follow the traffic regulations under which the vehicles run on left-side lanes will be described. In the present embodiment, a vehicle involves an automobile, a motorcycle, and a light vehicle. As shown 1, an own vehicle 10 includes a forward monitoring sensor 12, a lateral monitoring sensor 14, a rearward monitoring sensor 15, a position sensor 16, a vehicle speed sensor 18, a direction indicator 19, and the vehicle control apparatus 20. The own vehicle 10 further includes an engine ECU 41, a brake ECU 42, a steering ECU 43, an engine 44, a brake mechanism 45, and a steering mechanism 46.

The sensors 12, 14, 15, 16, and 18 are configured to be able to communicate with the vehicle control apparatus 20 and transmits detected information to the vehicle control apparatus 20. The forward monitoring sensor 12 is configured by various sensors for detecting an object present in front of the own vehicle 10. The lateral monitoring sensor 14 is configured by various sensors for detecting an object located laterally to the own vehicle 10. The rearward monitoring sensor 15 is configured by various sensors for detecting an object located behind the own vehicle 10. Each of the forward monitoring sensor 12, the lateral monitoring sensor 14, and the rearward monitoring sensor 15 includes an image sensor such as a camera, a radio wave radar, a lidar (laser radar), and a sound wave sensor. The radio wave radar emits radio waves (e.g., millimeter waves) and detects reflected waves from an object. The lidar emits laser light and detects reflected light from an object. The sound wave sensor emits sound waves and detects reflected light from an object. The forward monitoring sensor 12, the lateral monitoring sensor 14 and the rearward monitoring sensor 15 may be configured by at least one of the above sensors or another sensor as long as they can detect objects located in front of, laterally to, and behind the own vehicle 10.

The position sensor 16 detects a current location of the own vehicle 10. The position sensor 16 is, for example, a receiver that receives navigation signals from artificial satellites configuring a GNSS (Global Navigation Satellite System) via an antenna. The position sensor 16 can detect an azimuth corresponding to a traveling direction of the own vehicle 10. The position sensor 16 may include a gyro sensor for detecting a turning speed of the own vehicle 10 and may have a function of associating a current location with map data. The vehicle speed sensor 18 detects a speed of the own vehicle 10.

The direction indicator 19 notifies the surroundings of right or left turn or lane change of the own vehicle 10 with blinking when receiving an input from a driver. When a navigation system providing route guidance to a destination based on the current location is installed in the own vehicle 10, the direction indicator 19 may notify the surroundings of right or left turn or lane change of the own vehicle 10 with blinking based on guidance information of the navigation system instead of an input from the driver.

The vehicle control apparatus 20 includes a surrounding object detection section 21, a free space determination section 22, a preceding vehicle determination section 25, a rearward vehicle determination section 26, a cut-in vehicle determination section 27, a setting condition determination section 28, and an automated driving control section 29.

The automated driving control section 29 performs any of a following travel mode M1 and a constant speed travel mode M2 to automatically control driving of the own vehicle 10. In the following travel mode M1, the own vehicle 10 is caused to travel so as to follow a preceding vehicle 55 (FIG. 2) that is a vehicle to be followed and is located in front of the own vehicle 10. In the following travel mode M1, when it is not needed to change the vehicle to be followed to another vehicle, driving of the own vehicle 10 is controlled so that the distance to the preceding vehicle 55 is a predetermined set inter-vehicular distance PD. The set inter-vehicular distance PD may be set so that as a relative speed between the own vehicle 10 and the preceding vehicle 55 increases, the set inter-vehicular distance PD increases or so that as the relative speed decreases, the set inter-vehicular distance PD decreases. The set inter-vehicular distance PD of the present disclosure is a shortest distance between the own vehicle 10 and a vehicle to be followed (e.g., the preceding vehicle 55). In the constant speed travel mode M2, the own vehicle 10 is caused to travel at a predetermined set vehicle speed VD. The automated driving control section 29 performs automated driving of the own vehicle 10 when the driver operates a selection button or the like mounted to the own vehicle 10. In the present embodiment, when a vehicle to be followed is present, the following travel mode M1 is performed. When no vehicles to be followed are present (a vehicle to be followed is absent), the constant speed travel mode M2 is performed.

The surrounding object detection section 21 (FIG. 1) acquires detection information from the forward monitoring sensor 12, the lateral monitoring sensor 14, and the position sensor 16 to detect surrounding objects located around the own vehicle 10 such as a vehicle by using the acquired detection information. Detection of surrounding objects involves detection of presence or absence of a surrounding object and detection of a distance to the surrounding object from the own vehicle 10 (relative position), a direction in which the surrounding object is present, and a relative speed of the surrounding object.

The free space determination section 22 determines presence or absence of a free space FS (FIG. 2) by using object detection information acquired by the surrounding object detection section 21, lane information detected by the forward monitoring sensor 12, current location information detected by the position sensor 16, and the like. The free space FS intersects an own lane Ln1 that is a driving lane of the own vehicle 10. Vehicles can travel in the free space FS. The free space FS is, for example, another driving lane intersecting the own lane Ln1, a parking area or a side road diverging from the own lane Ln1, or the like. For example, when guide rails are located on the left side of the own lane Ln1, the surrounding object detection section 21 detects a change from a state where reflected radio waves are detected to a state where reflected sound waves are not detected, based on information acquired from the sound wave sensor of the lateral monitoring sensor 14. In this case, the free space determination section 22 determines that an exit/entrance of the free space FS is present at an area where reflected sound waves are not detected. For example, when guide rails are located on the left side of the own lane Ln1, the free space determination section 22 may determine presence or absence of the free space FS by using a captured image acquired by the surrounding object detection section 21 from the camera of the lateral monitoring sensor 14.

The preceding vehicle determination section 25 uses detection information acquired by the surrounding object detection section 21 to determine whether a preceding vehicle 55 (FIG. 2) traveling in front of the own vehicle 10 is present. For example, the preceding vehicle determination section 25 determines whether the preceding vehicle 55 is present by using pattern matching based on lane information detected by the forward monitoring sensor 12 and a captured image of the forward monitoring sensor 12 acquired by the surrounding object detection section 21. The preceding vehicle 55 is a vehicle located immediately before the own vehicle 10 in the own lane Ln1.

The rearward vehicle determination section 26 uses detection information acquired by the surrounding object detection section 21 to determine presence or absence of a rearward vehicle 56 (FIG. 2) located behind the own vehicle 10. For example, the rearward vehicle determination section 26 determines presence or absence of the rearward vehicle 56 by using pattern matching based on a captured image of the rearward monitoring sensor 15 acquired by the surrounding object detection section 21. The rearward vehicle 56 is a vehicle located immediately after the own vehicle 10 in the own lane Ln1.

The cut-in vehicle determination section 27 uses lane information detected by the forward monitoring sensor 12 and detection information acquired by the surrounding object detection section 21 to determine presence or absence of the cut-in vehicle 70 located in the free space FS. The cut-in vehicle 70 (FIG. 2) is a vehicle that is located in the free space FS and is scheduled to cut in a space in front of the own vehicle 10 in the own lane Ln1. When at least one of the following cut-in condition 1 and cut-in condition 2 is met, the cut-in vehicle determination section 27 makes a cut-in presence determination that the cut-in vehicle 70 is present.

<Cut-In Condition 1>

A vehicle located in the free space FS is blinking a direction indicator for left turn.

<Cut-In Condition 2>

A vehicle located in the free space FS is stopped in the vicinity of an exit of the free space FS and is blinking a direction indicator for right turn.

Figure 3:
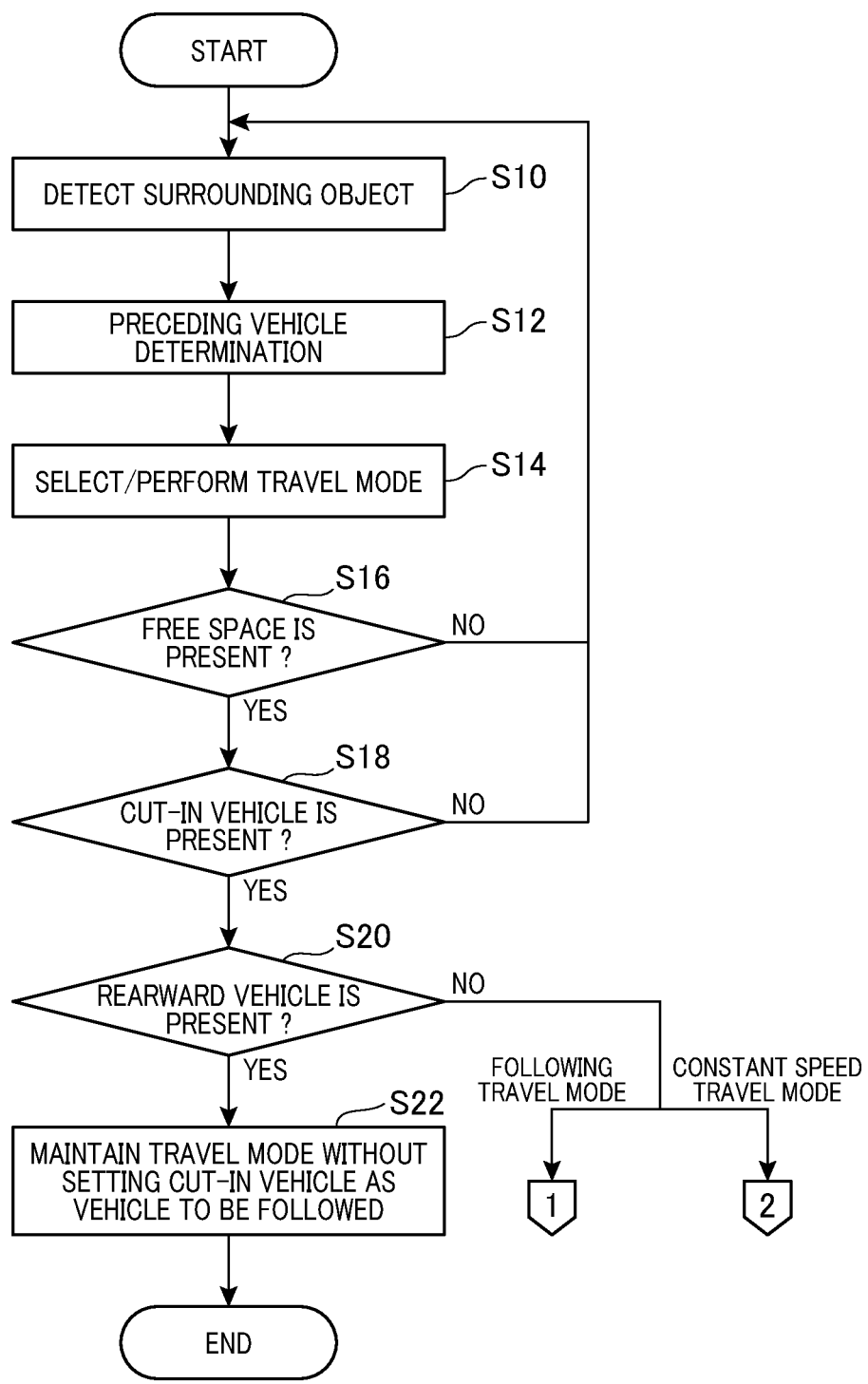
FIG. 3 is a first flowchart executed by the vehicle control apparatus.

The setting condition determination section 28 determines whether a setting condition for setting another vehicle as a vehicle to be followed is met. The setting condition may be made due to the presence of the free space FS. In the present embodiment, the setting condition determination section 28 also perform determination by the cut-in vehicle determination section 27. Specifically, when a cut-in presence determination that the cut-in vehicle 70 is present is made by the cut-in vehicle determination section 27, the setting condition determination section 28 determines that the setting condition is met. When the setting condition is met, the automated driving control section 29 sets a vehicle scheduled to enter the own lane Ln1 from the free space FS, specifically the cut-in vehicle 70 that enters the own lane Ln1 from the free space FS, as a new vehicle to be followed and performs the following travel mode M1. The details will be described later Upon externally receiving a control start instruction for automated driving of the own vehicle 10, the automated driving control section 29 performs processes illustrated in the flowcharts shown in FIG. 3 to FIG. 5. As shown in FIG. 3, the surrounding object detection section 21 uses information acquired from the forward monitoring sensor 12, the lateral monitoring sensor 14, the rearward monitoring sensor 15, and the position sensor 16 to detect a surrounding object (step S10). Next, the preceding vehicle determination section 25 uses detection information of the surrounding object detection section 21 to determine presence or absence of the preceding vehicle 55 located in front of the own vehicle 10 (step S12). Next, the automated driving control section 29 selects and performs the travel mode M1 or M2 according to the determination result of the preceding vehicle 55 in step S12 (step S14).

Next, the free space determination section 22 determines presence or absence of the free space FS (S16). If it is determined the free space FS is not present, the vehicle control apparatus 20 performs the process of step S10 again. In contrast, if it is determined the free space FS is present, the cut-in vehicle determination section 27 determines presence or absence of the cut-in vehicle 70 (step S18). If it is determined the cut-in vehicle 70 is not present, the vehicle control apparatus 20 performs the process of step S10 again. In contrast, if it is determined the cut-in vehicle 70 is present (a cut-in presence determination is made), the rearward vehicle determination section 26 determine presence or absence of the rearward vehicle 56 (step S20).

If it is determined that the rearward vehicle 56 is present, even when a cut-in presence determination is made, automated driving is performed while the travel mode (the following travel mode M1 or the constant speed travel mode M2) of the own vehicle 10 is maintained without setting the cut-in vehicle 70 as a vehicle to be followed (step S22).

Figure 4:
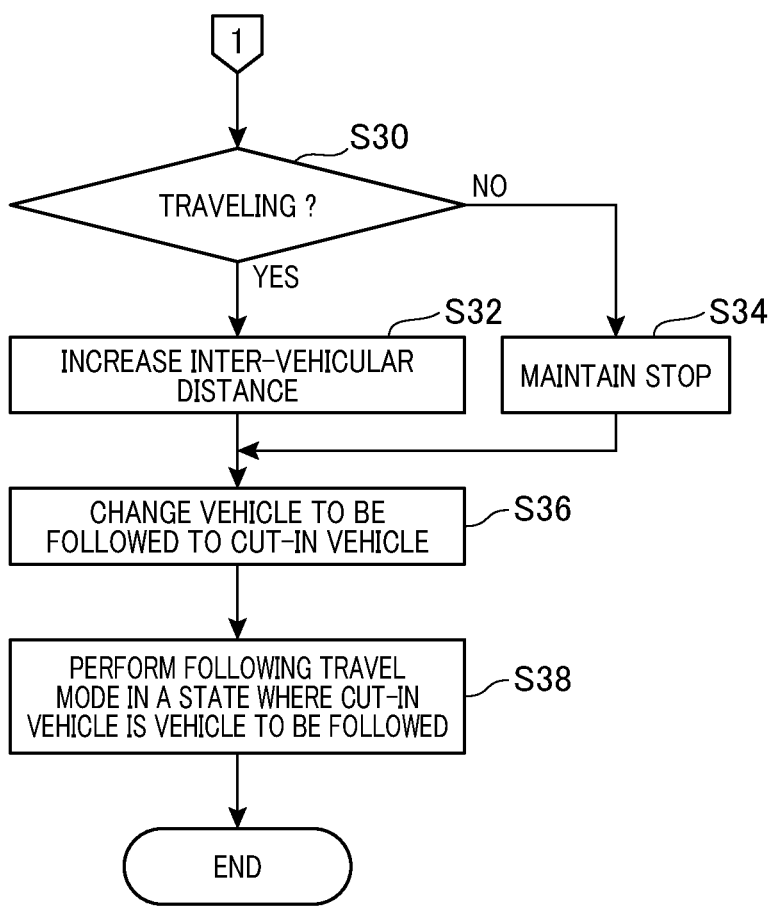
FIG. 4 is a second flowchart executed by the vehicle control apparatus.
Figure 5:
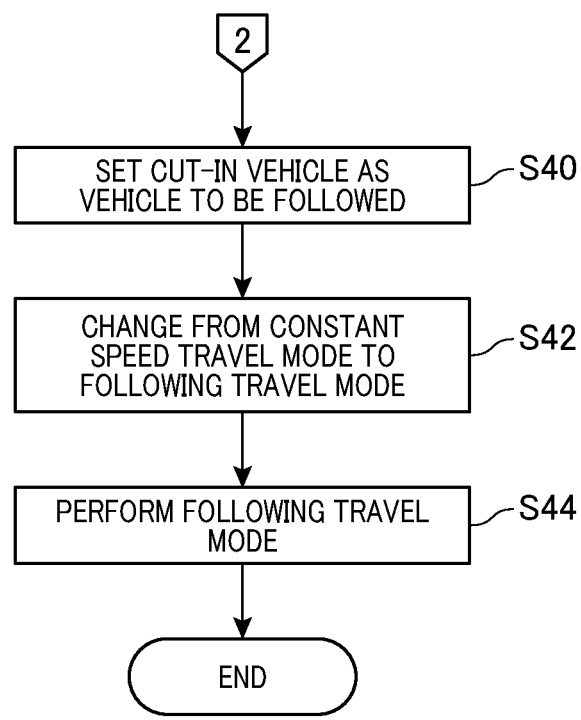
FIG. 5 is a third flowchart executed by the vehicle control apparatus.

If it is determined that the rearward vehicle 56 is not present, the flowchart shown in FIG. 4 is executed when the automated driving control section 29 is performing the following travel mode M1, and the flowchart shown in FIG. 5 is executed when the automated driving control section 29 is performing the constant speed travel mode M2.

As shown in FIG. 4, when the following travel mode M1 is being performed, the automated driving control section 29 determines whether the own vehicle 10 is traveling while following the preceding vehicle 55 by using detection information of the vehicle speed sensor 18 (step S30). When the own vehicle 10 is traveling, the automated driving control section 29 controls the own vehicle 10 so that the inter-vehicular distance to the preceding vehicle 55 is longer than the set inter-vehicular distance PD (step S32). For example, the automated driving control section 29 transmits an instruction for decelerating the own vehicle 10 using brake mechanism 45 to the brake ECU 42, whereby increasing the inter-vehicular distance. In contrast, when the own vehicle 10 is stopped due to the stop of the preceding vehicle 55, the automated driving control section 29 transmits a stop instruction to the brake ECU 42, even if the preceding vehicle 55 starts traveling, to maintain the stop of the own vehicle 10 (step S34). Executing step S32 or step S34 allows the cut-in vehicle 70 to smoothly cut in a space between the own vehicle 10 and the preceding vehicle 55.

Figure 2:
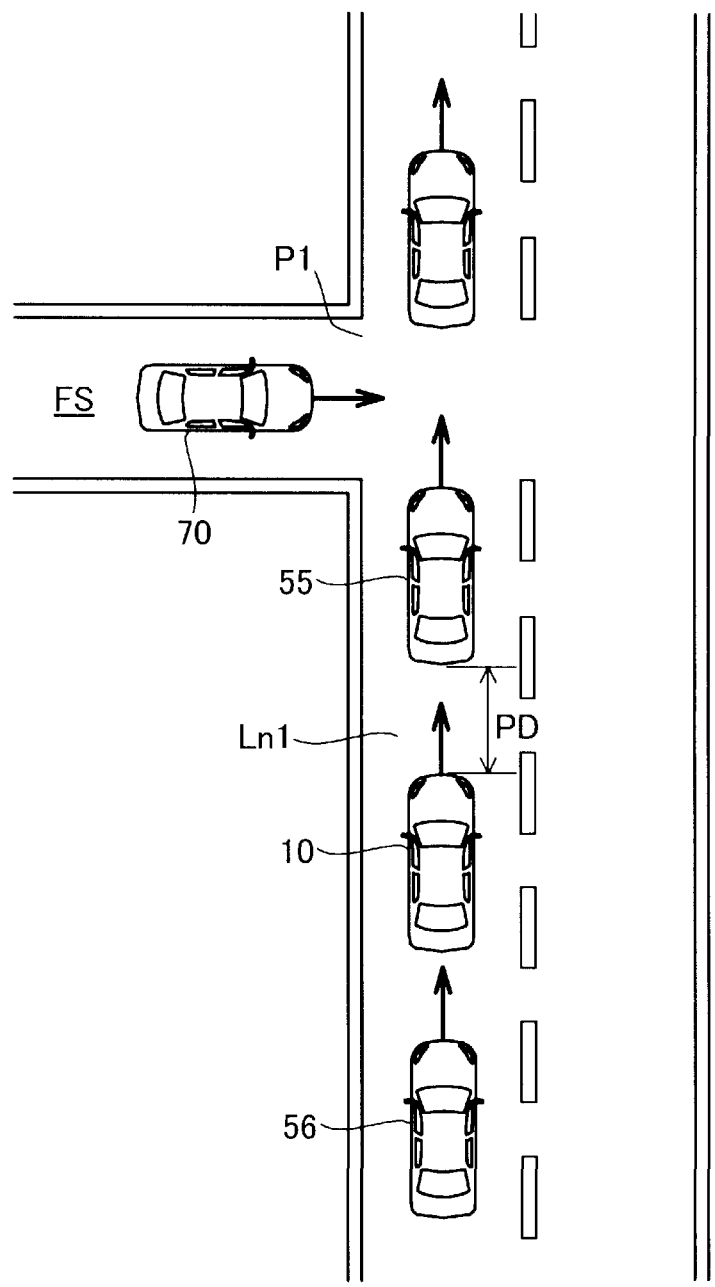
FIG. 2 is a diagram for illustrating a travel mode of an automated driving control section.

After step S32 or step S34, the automated driving control section 29 changes the vehicle to be followed from the preceding vehicle 55 to the cut-in vehicle 70 (step S36). In step S36, the automated driving control section 29 changes the vehicle to be followed from the preceding vehicle 55 to the cut-in vehicle 70 at a predetermined time point before the whole cut-in vehicle 70 enters the own lane Ln1. For example, as shown in FIG. 2, at the time point when the cut-in vehicle 70 has reached an exit point P1 of the free space FS, the automated driving control section 29 changes the vehicle to be followed from the preceding vehicle 55 to the cut-in vehicle 70. Hence, the automated driving control section 29 performs the following travel mode M1 in a state where the cut-in vehicle 70 is a new vehicle to be followed (step S38).

As shown in FIG. 5, when the constant speed travel mode M2 is being performed, the automated driving control section 29 sets the cut-in vehicle 70 as a vehicle to be followed (step S40). Hence, the automated driving control section 29 changes the travel mode from the constant speed travel mode M2 to the following travel mode M1 (step S42). The automated driving control section 29 sets the cut-in vehicle 70 as a vehicle to be followed at a time point before the whole cut-in vehicle 70 enters the own lane Ln1. For example, the automated driving control section 29 may set the cut-in vehicle 70 as a vehicle to be followed at the time point when the cut-in vehicle 70 has reached the exit point P1 (FIG. 2) or at the time point when the cut-in vehicle determination section 27 has made a cut-in presence determination. The automated driving control section 29 changes the travel mode from the constant speed travel mode M2 to the following travel mode M1 to perform the following travel mode M1 in a state where the cut-in vehicle 70 is a new vehicle to be followed (step S44).

Figure 6:
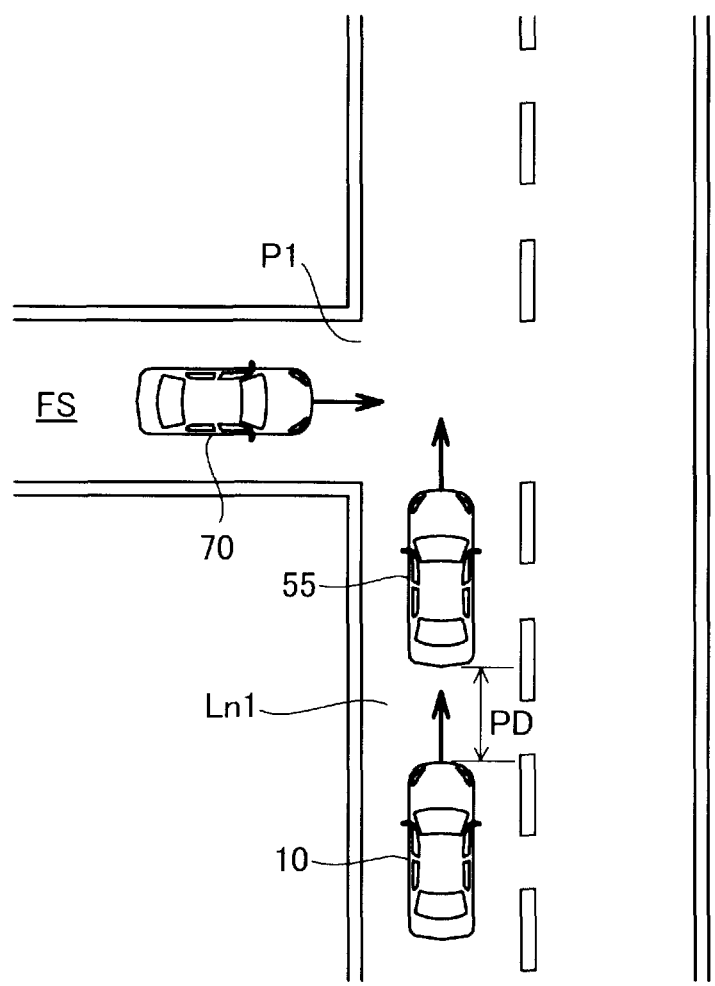
FIG. 6 is a first diagram for illustrating control performed by the vehicle control apparatus when a cut-in vehicle is present.
Figure 7:
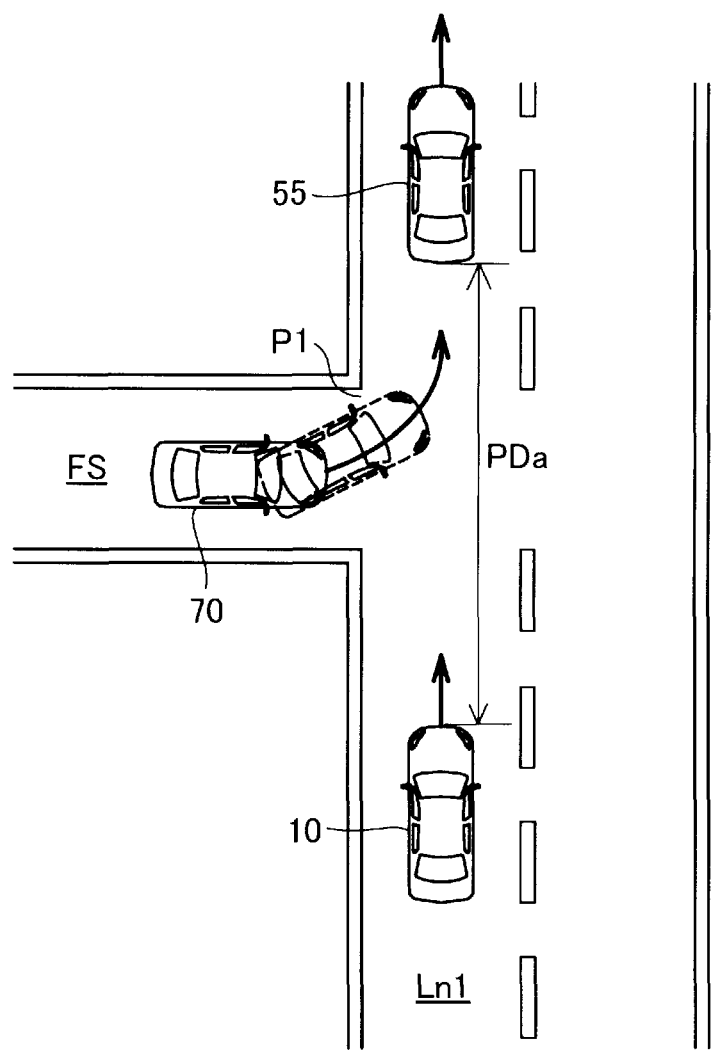
FIG. 7 is a second diagram for illustrating control performed by the vehicle control apparatus when a cut-in vehicle is present.

Specific examples of steps S30, S32, S36, and S38 in FIG. 4 will be described with reference to FIG. 6 and FIG. 7. As shown in FIG. 6, when the own vehicle 10 that is performing the following travel mode M1 is traveling while following the preceding vehicle 55, and a cut-in presence determination is made, the automated driving control section 29 performs the control described below. That is, as shown in FIG. 7, the automated driving control section 29 controls the own vehicle 10 so that an inter-vehicular distance PDa to the preceding vehicle 55 is longer than the set inter-vehicular distance PD. Hence, the cut-in vehicle 70 can smoothly cut in a space between the own vehicle 10 and the preceding vehicle 55. In addition, the automated driving control section 29 changes the vehicle to be followed from the preceding vehicle 55 to the cut-in vehicle 70 at the time point when the cut-in vehicle 70 has reached the exit point P1. That is, setting the cut-in vehicle 70 to the vehicle to be followed at the time point before the whole cut-in vehicle 70 enters the own lane Ln1 can decrease the probability that the timing at which the cut-in vehicle 70 is set as the vehicle to be followed is delayed. Hence, the probability that the own vehicle 10 collides with the cut-in vehicle 70 or excessively approaches the cut-in vehicle 70 can be decreased.

Figure 8:
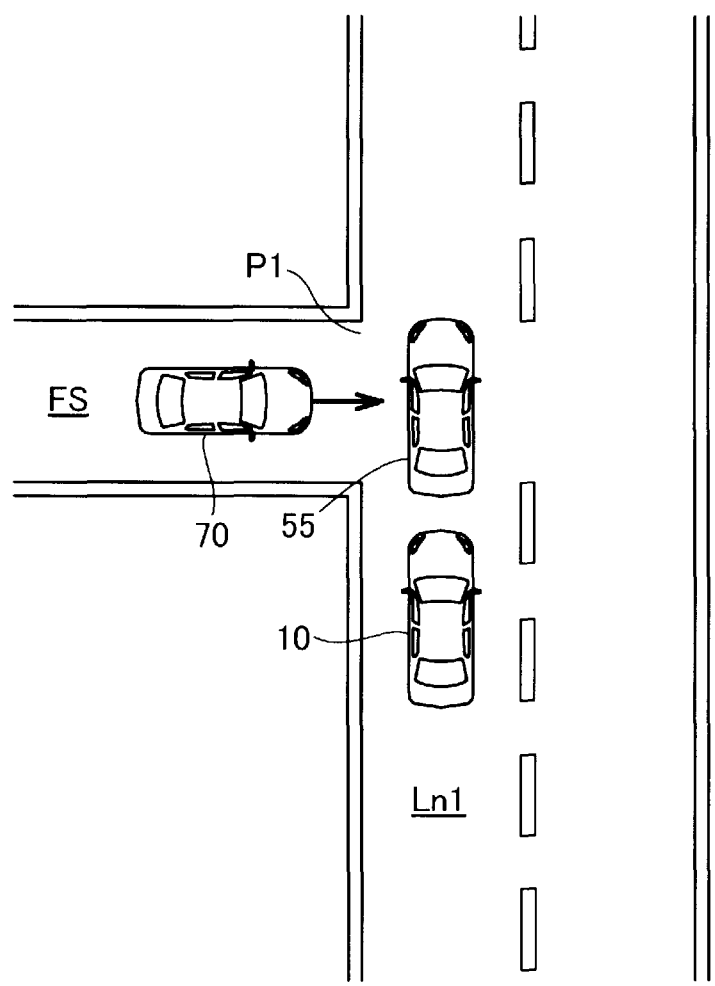
FIG. 8 is a third diagram for illustrating control performed by the vehicle control apparatus when a cut-in vehicle is present.
Figure 9:
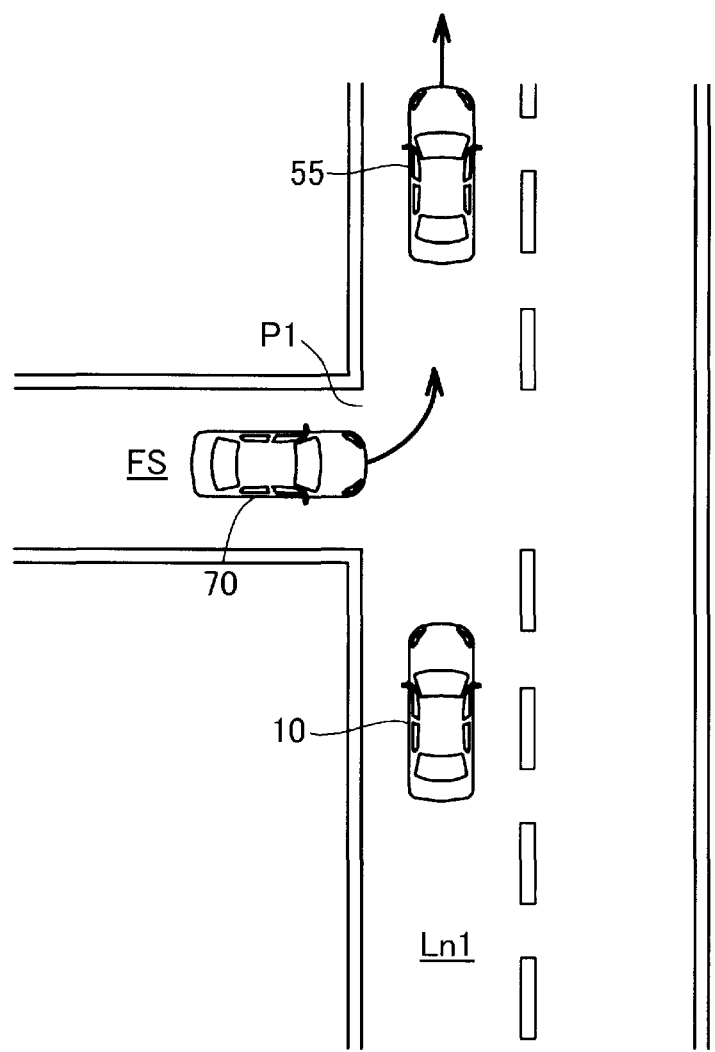
FIG. 9 is a fourth diagram for illustrating control performed by the vehicle control apparatus when a cut-in vehicle is present.

Next, specific examples of steps S30, S34, S36, and S38 in FIG. 4 will be described with reference to FIG. 8 and FIG. 9. As shown in FIG. 8, when the own vehicle 10 that is performing the following travel mode M1 is stopped due to the stop of the preceding vehicle 55, and a cut-in presence determination is made, the automated driving control section 29 performs the control described below. That is, as shown in FIG. 9, the automated driving control section 29 maintains the stop of the own vehicle 10 even if the preceding vehicle 55 starts traveling (step S34). Hence, the cut-in vehicle 70 can smoothly cut in a space between the own vehicle 10 and the preceding vehicle 55. In addition, the automated driving control section 29 changes the vehicle to be followed from the preceding vehicle 55 to the cut-in vehicle 70 at the time point when the cut-in vehicle 70 has reached the exit point P1 (step S36). That is, setting the cut-in vehicle 70 as a vehicle to be followed at the time point before the whole cut-in vehicle 70 enters the own lane Ln1 can decrease the probability that the timing at which the cut-in vehicle 70 is set as a vehicle to be followed is delayed. Hence, the probability that the own vehicle 10 collides with the cut-in vehicle 70 or excessively approaches the cut-in vehicle 70 can be decreased.

Figure 10:
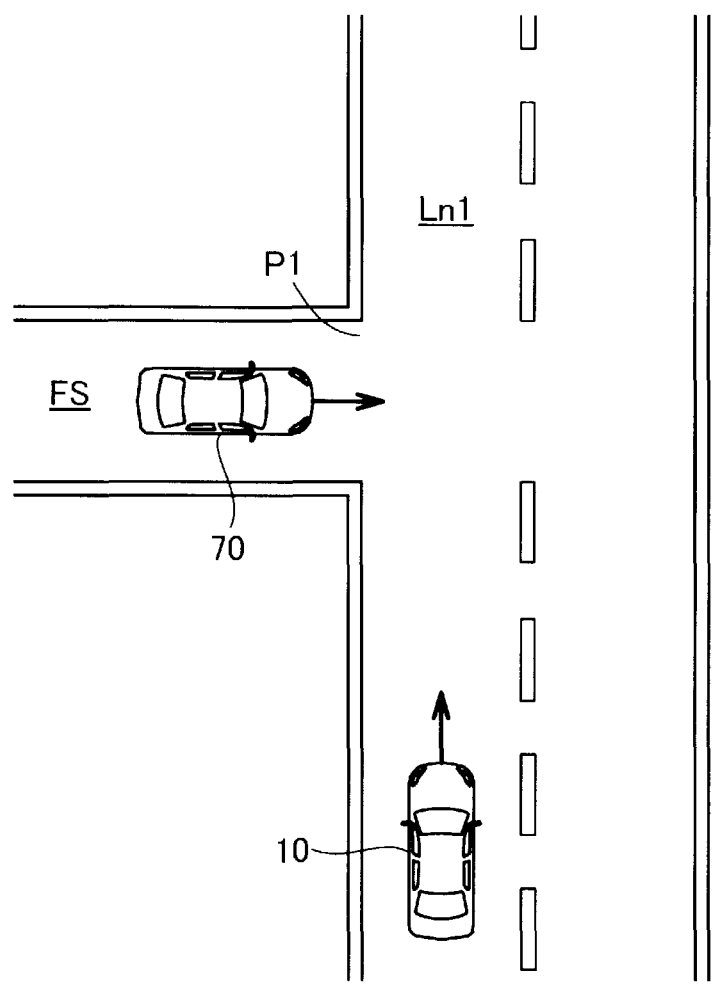
FIG. 10 is a fifth diagram for illustrating control performed by the vehicle control apparatus when a cut-in vehicle is present.
Figure 11:
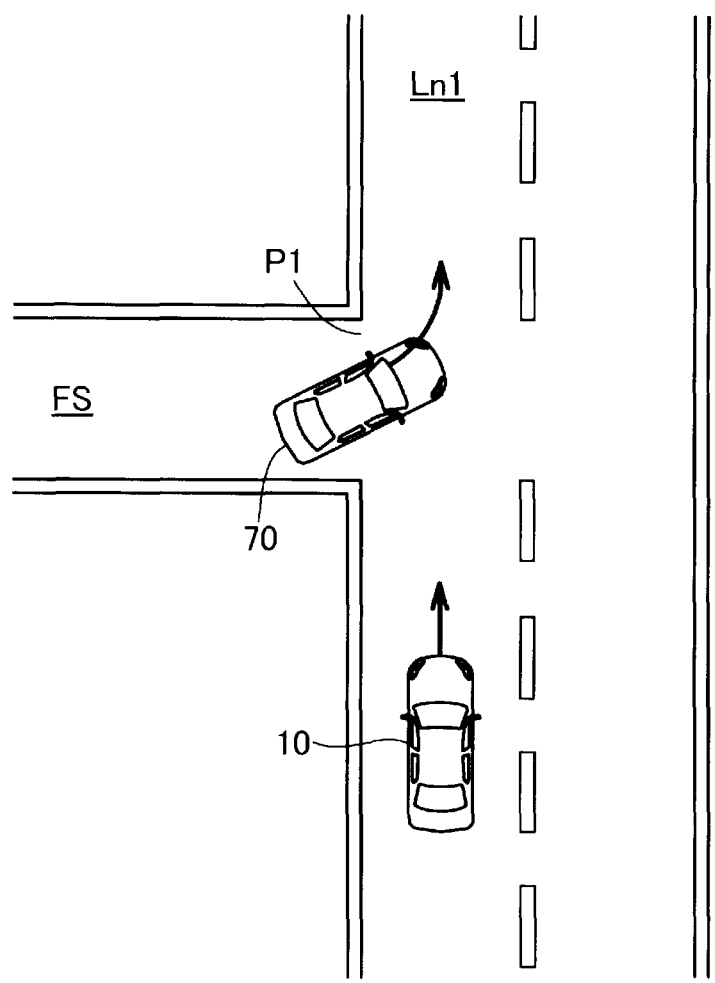
FIG. 11 is a sixth diagram for illustrating control performed by the vehicle control apparatus when a cut-in vehicle is present.

Next, specific examples of steps S40 to S44 shown in FIG. 5 will be described with reference to FIG. 10 and FIG. 11. As shown in FIG. 10, when the own vehicle 10 is traveling in the constant speed travel mode M2, and a cut-in presence determination is made, the automated driving control section 29 sets the cut-in vehicle 70 as a vehicle to be followed and changes the travel mode from the constant speed travel mode M2 to the following travel mode M1 to perform the following travel mode M1. In the example illustrated in FIG. 10, at the time point when a cut-in presence determination that the cut-in vehicle 70 is present in the free space FS is made, the automated driving control section 29 sets the cut-in vehicle 70 as a vehicle to be followed and changes the travel mode from the constant speed travel mode M2 to the following travel mode M1 to perform the following travel mode M1 (step S40, S42, S44). Hence, as shown in FIG. 11, from a predetermined time point before the whole cut-in vehicle 70 enters the own lane Ln1, the cut-in vehicle 70 is set as a vehicle to be followed to perform the following travel mode M1. Hence, since setting the cut-in vehicle 70 as a vehicle to be followed can decrease the probability of excessive delay, the probability that the own vehicle 10 approaches or collides with the cut-in vehicle 70 can be decreased.

Figure 12:
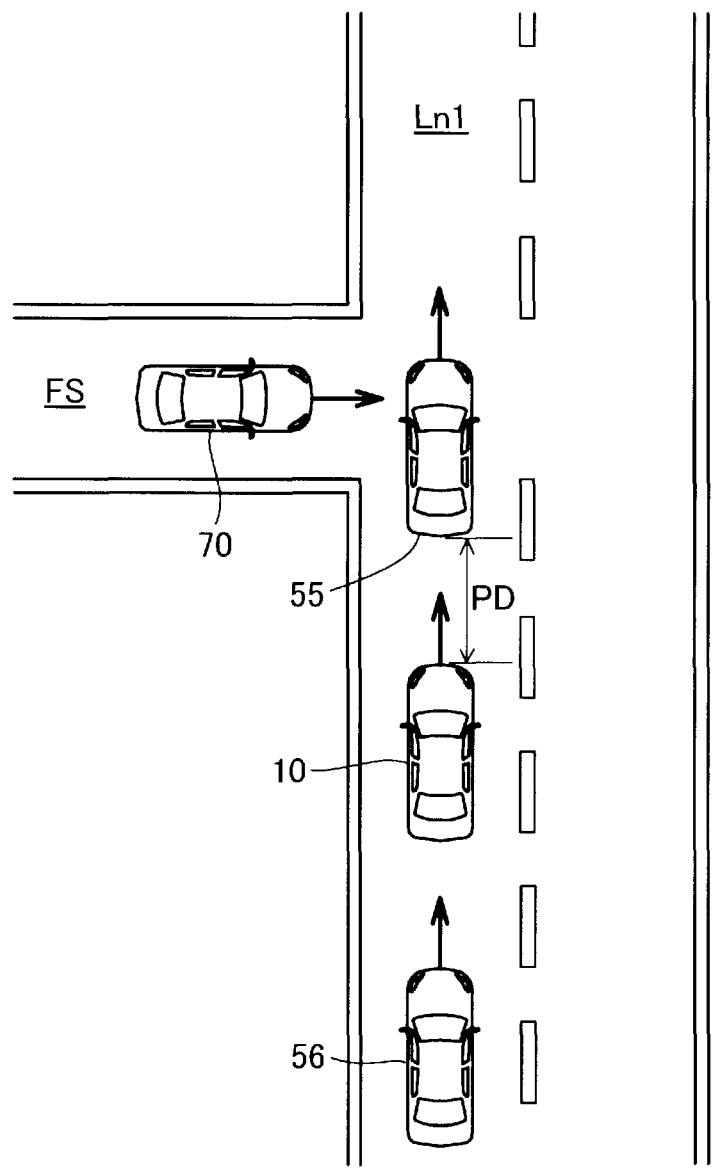
FIG. 12 is a first diagram for illustrating control performed by the vehicle control apparatus when a rearward vehicle is present.
Figure 13:
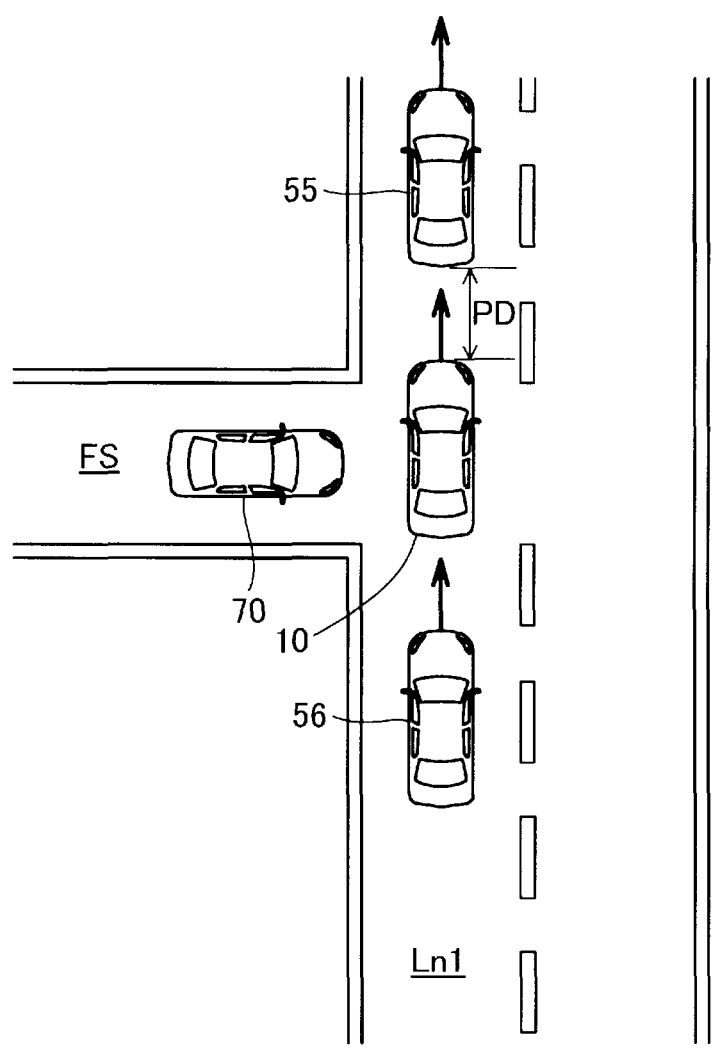
FIG. 13 is a second diagram for illustrating control performed by the vehicle control apparatus when a rearward vehicle is present.

Next, specific examples of steps S20 and S22 in FIG. 3 will be described with reference to FIG. 12 to FIG. 15. As shown in FIG. 12, the own vehicle 10 is traveling while following the preceding vehicle 55 in the following travel mode M1. In this case, even when a cut-in presence determination is made, if the rearward vehicle determination section 26 determines that the rearward vehicle 56 is present, as shown in FIG. 13, the automated driving control section 29 does not change the vehicle to be followed from the preceding vehicle 55 to the cut-in vehicle 70. That is, the automated driving control section 29 causes the own vehicle 10 to travel in the following travel mode M1 while maintaining the distance to the preceding vehicle 55 as the set inter-vehicular distance PD. Hence, since the probability that the own vehicle 10 decelerates due to setting the cut-in vehicle 70 as a new vehicle to be followed can be decreased, the probability that the rearward vehicle 56 collides with the own vehicle 10 can be decreased.

Figure 14:
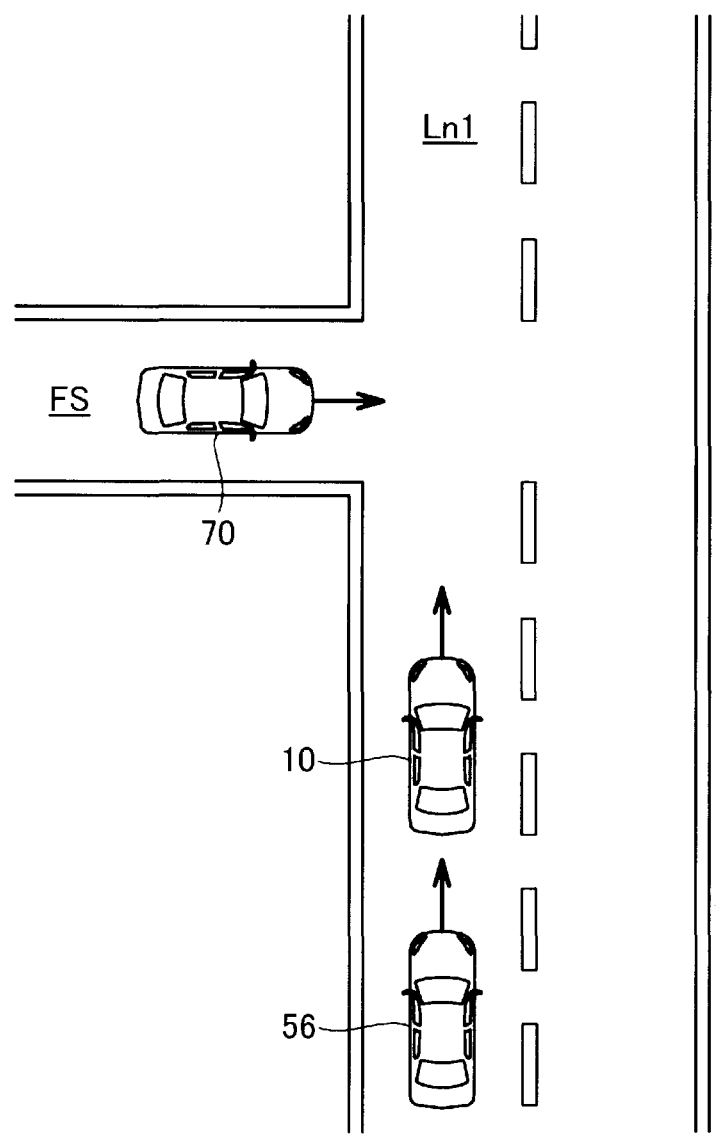
FIG. 14 is a third diagram for illustrating control performed by the vehicle control apparatus when a rearward vehicle is present.
Figure 15:
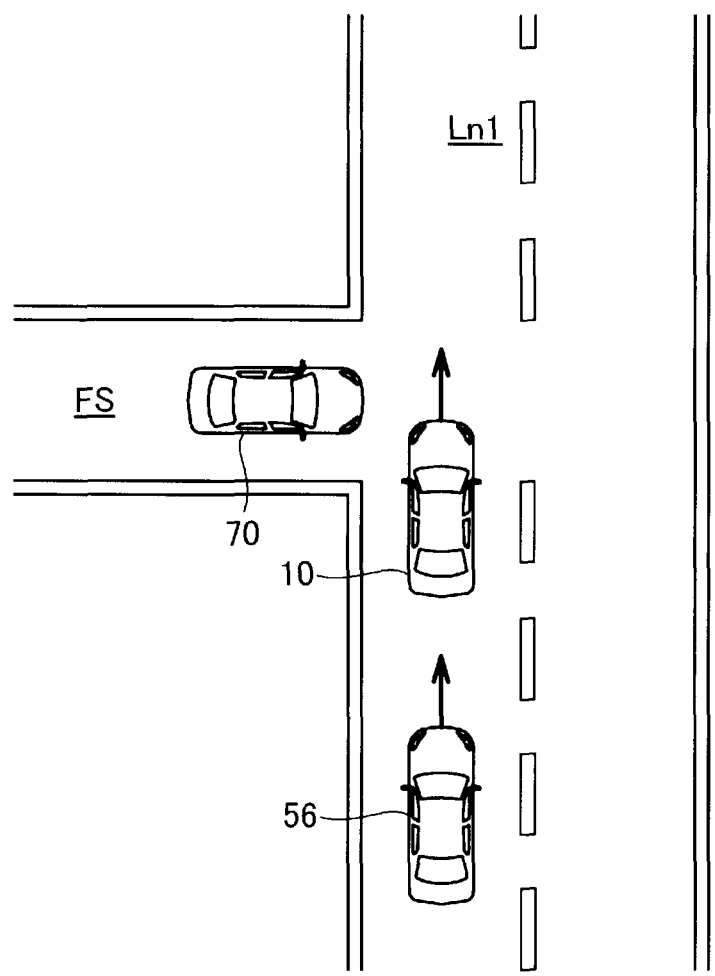
FIG. 15 is a fourth diagram for illustrating control performed by the vehicle control apparatus when a rearward vehicle is present.

As shown in FIG. 14, when the own vehicle 10 is traveling in the constant speed travel mode M2, if a cut-in presence determination is made and the rearward vehicle determination section 26 determines that the rearward vehicle 56 is present, as shown in FIG. 15, the automated driving control section 29 maintains the constant speed travel mode M2 without change to the following travel mode M1. Hence, since the probability that the own vehicle 10 decelerates due to setting the cut-in vehicle 70 as a vehicle to be followed can be decreased, the probability that the rearward vehicle 56 collides with the own vehicle 10 can be decreased.

According to the first embodiment described above, if a setting condition that is for setting another vehicle as a vehicle to be followed and may be made due to the presence of the free space FS is met, a first other vehicle (cut-in vehicle 70) that is another vehicle is set as a vehicle to be followed to perform the following travel mode M1. That is, if the setting condition determination section 28 determines that the setting condition for setting the cut-in vehicle 70 as a vehicle to be followed is met, the cut-in vehicle 70 is set as a vehicle to be followed to perform the following travel mode M1. Hence, the vehicle control apparatus 20 can more smoothly perform the following travel mode M1 with respect to another vehicle that may be set as a vehicle to be followed.

In addition, according to the first embodiment, the setting condition determination section 28 determines whether another vehicle traveling in front of the own vehicle 10 is set as a vehicle to be followed with a criterion different between a case in which the free space determination section 22 determines that the free space FS is present and a case in which the free space determination section 22 determines that the free space FS is not present (absent). That is, if determining that the free space FS is not present, the setting condition determination section 28 determines whether a first criterion for determining that the preceding vehicle 55 traveling in front of the own vehicle 10 is present is met. If the first criterion is met, the automated driving control section 29 sets the preceding vehicle 55 as a vehicle to be followed to perform the following travel mode M1. In contrast, if determining that the free space FS is present, the setting condition determination section 28 determines whether the first criterion is met and whether a second criterion for determining that the cut-in vehicle 70 is present is met. If the second criterion is met regardless of whether the first criterion is met, the automated driving control section 29 sets the cut-in vehicle 70 as a vehicle to be followed to perform the following travel mode M1. Hence, since the criterion for determining that the following travel mode M1 is performed can be changed between the case where the free space FS is present and the case where the free space FS is not present, another vehicle can be smoothly set to a vehicle to be followed.

B. SECOND EMBODIMENT

In the present embodiment, similarly to the first embodiment, a vehicle control apparatus 20a used in an area where vehicles follow the traffic regulations under which the vehicles run on left-side lanes will be described. Components similar to those of the own vehicle 1 (FIG. 1) in the first embodiment and steps in flowcharts similar to those in the first embodiment are denoted by the same reference signs, and redundant descriptions are appropriately omitted.

Figure 16:
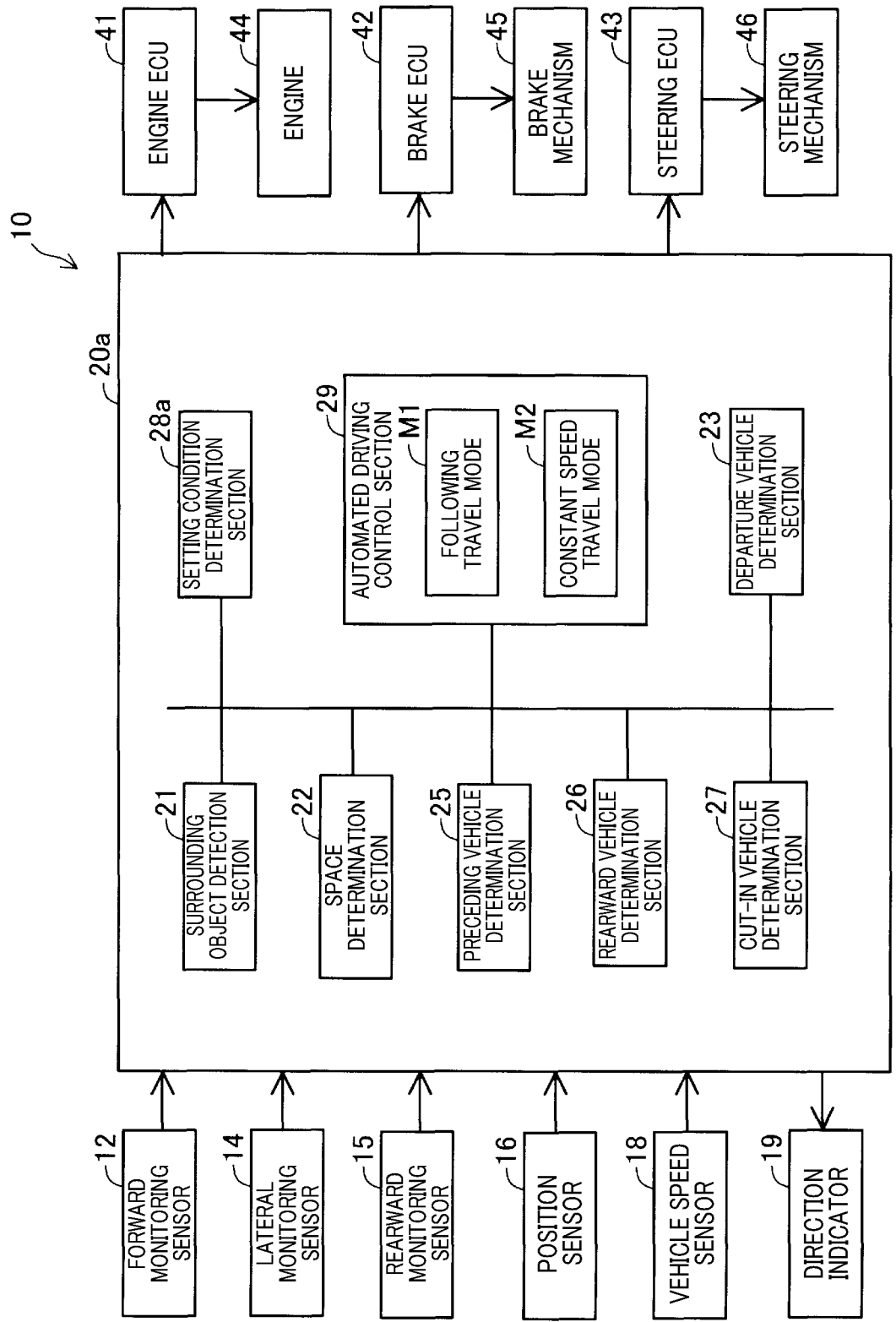
FIG. 16 is a block diagram of an own vehicle including a vehicle control apparatus according to a second embodiment.
Figure 17:
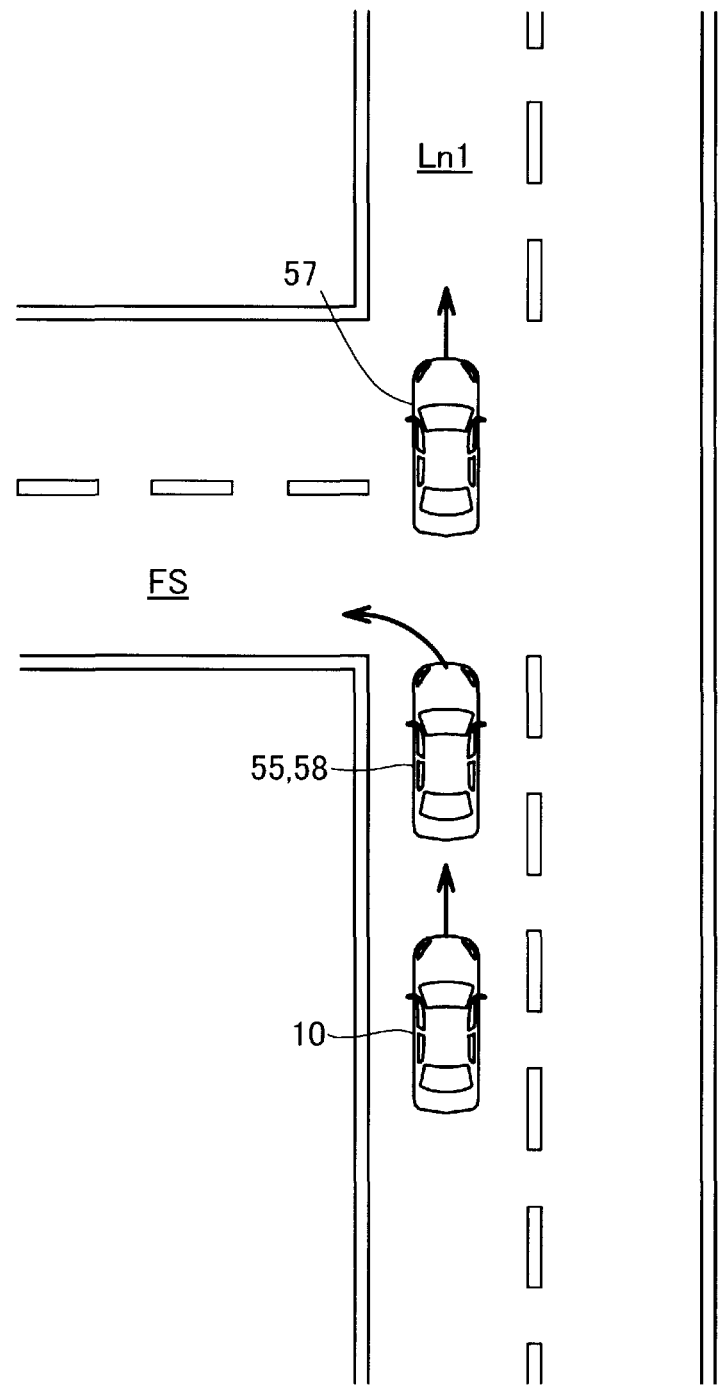
FIG. 17 is a diagram for illustrating a departure vehicle.

The vehicle control apparatus 20a (FIG. 16) additionally includes a departure vehicle determination section 23 that determines whether a first preceding vehicle 55 (FIG. 17) that is a preceding vehicle followed in the following travel mode M1 is a departure vehicle 58. As shown in FIG. 17, the departure vehicle 58 is the first preceding vehicle 55 scheduled to depart from the own lane Ln1 to enter the free space FS. If at least one of the following departure condition 1 and departure condition 2 is met, the departure vehicle determination section 23 makes a departure presence determination that the first preceding vehicle 55 as a preceding vehicle is the departure vehicle 58.

<Departure Condition 1>

The first preceding vehicle 55 is causing a direction indicator for left turn to blink.

<Departure Condition 2>

The first preceding vehicle 55 faces the free space FS.

For the departure condition 2, any determination method can be used if a determination that the first preceding vehicle 55 faces the free space FS can be made. For example, if the traveling direction of the first preceding vehicle 55 includes a direction to the free space FS (left) and the angle of the traveling direction with respect to the direction along the own lane Ln1 is a first threshold value or more, the departure vehicle determination section 23 determines that the first preceding vehicle 55 faces the free space FS. For example, if the ratio of an image of a left side surface of the first preceding vehicle 55 to an image of the whole first preceding vehicle 55 is a predetermined threshold value or more in an image captured by a camera of the forward monitoring sensor 12, it may be determined that the first preceding vehicle 55 faces the free space FS.

If the cut-in vehicle determination section 27 has made a cut-in presence determination or if the departure vehicle determination section 23 has made a departure presence determination, or if both of the determinations have been made, a setting condition determination section 28 determines that a setting condition is met.

Figure 18:
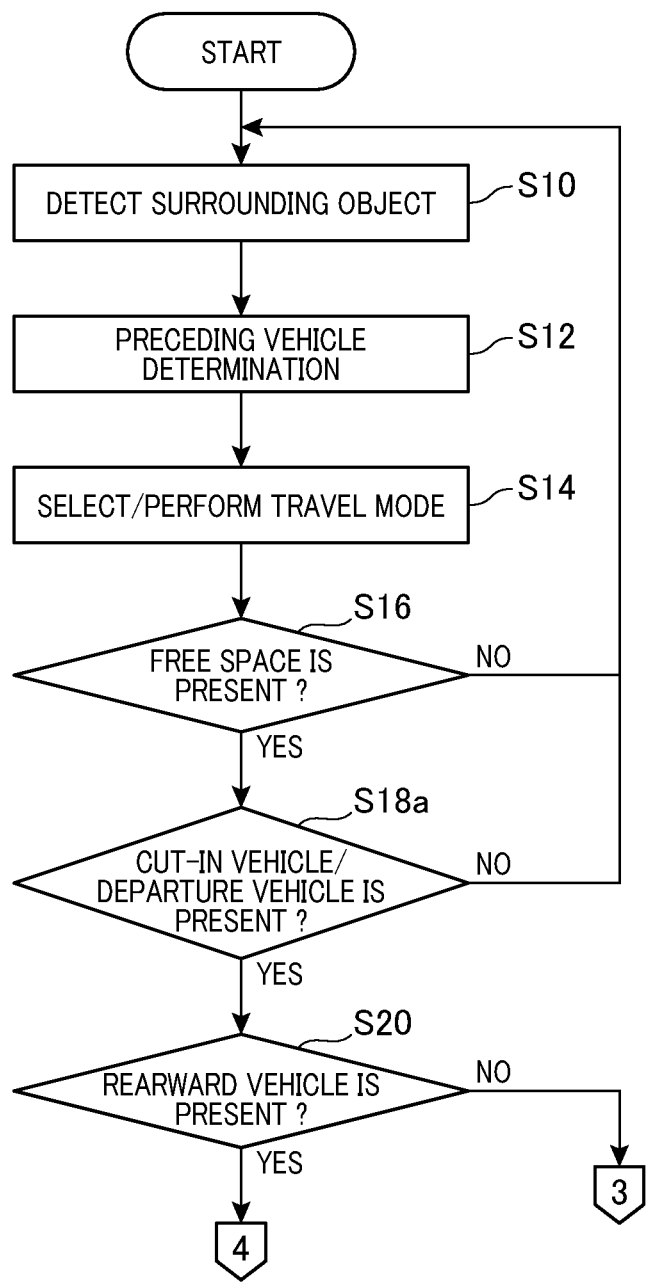
FIG. 18 is a first flowchart executed by a vehicle control apparatus according to a second embodiment.
Figure 19:
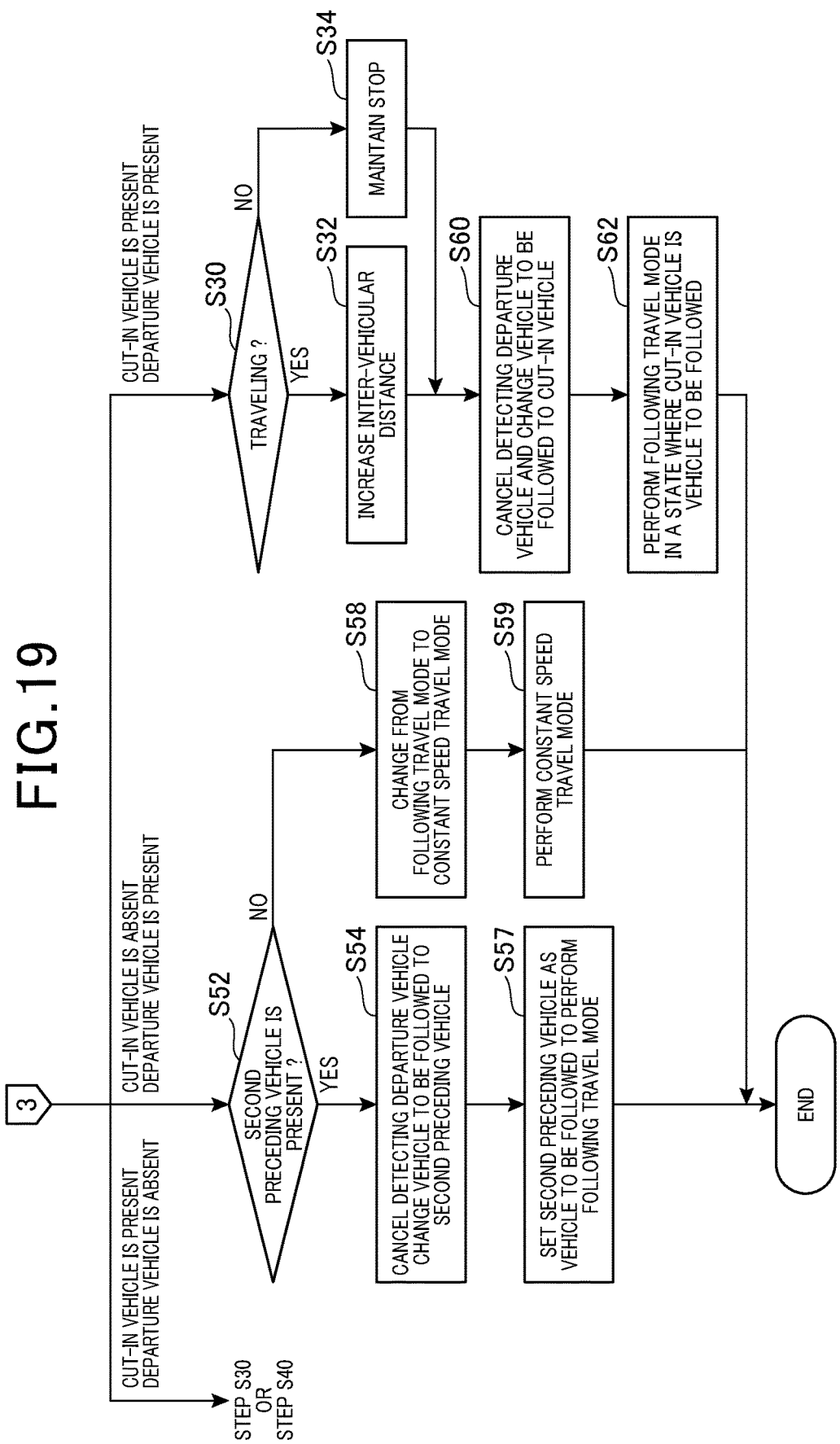
FIG. 19 is a second flowchart executed by the vehicle control apparatus according to the second embodiment.
Figure 20:
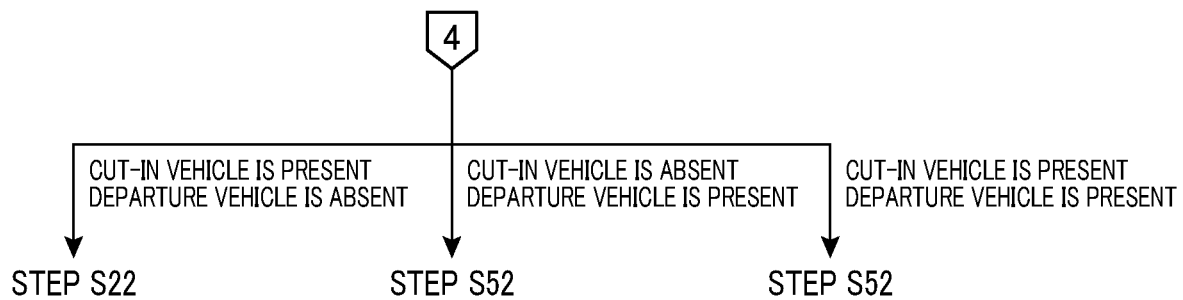
FIG. 20 is a third flowchart executed by a vehicle control apparatus according to a third embodiment.

As shown in FIG. 18, if Yes determination is made in step S16, the cut-in vehicle determination section 27 and the departure vehicle determination section 23 determine presence or absence of the cut-in vehicle 70 and the departure vehicle 58 (step S18a). Neither the cut-in vehicle 70 nor the departure vehicle 58 is present, step S10 is executed again. In contrast, at least one of the cut-in vehicle 70 and the departure vehicle 58 is present, step S20 is executed. If No determination is made in step S20, the flowchart shown in FIG. 19 is executed. If Yes determination is made in step S20, the flowchart shown in FIG. 20 is executed.

As shown in FIG. 19, if a cut-in presence determination that the cut-in vehicle 70 is present and a departure absence determination that the departure vehicle 58 is not present are made in step S18a, the vehicle control apparatus 20a performs the following process. That is, when the following travel mode M1 is being performed, the vehicle control apparatus 20a performs the process of step S30 and later shown in FIG. 4. When constant speed travel mode M2 is being performed, the vehicle control apparatus 20a performs the process of step S40 and later shown in FIG. 5.

As shown in FIG. 19, if a cut-in absence determination that the cut-in vehicle 70 is not present and a departure presence determination are made in step S18a, the vehicle control apparatus 20a performs step S52 and later. First, the preceding vehicle determination section 25 determines whether a second preceding vehicle 57 (FIG. 17) that is a new vehicle to be followed is present in front of the departure vehicle 58 (step S52). If the second preceding vehicle 57 that is a second other vehicle is present, when a predetermined positional relationship (departure positional relationship) is established by which it can be determined that the departure vehicle 58 and the own vehicle 10 are unlikely to collide with each other, an automated driving control section 29 performs the following process. That is, the automated driving control section 29a releases the departure vehicle 58 from being detected as a vehicle to be followed, and changes the vehicle to be followed from the departure vehicle 58 to the second preceding vehicle 57 (step S54). Hence, the automated driving control section 29a sets the second preceding vehicle 57 as a new vehicle to be followed to perform the following travel mode M1 (step S57). Step S54 and step S57 can prevent the own vehicle 10 from unnecessarily maintaining an inter-vehicular distance to the departure vehicle 58 while decreasing the probability that the departure vehicle 58 collides with the own vehicle 10.

If the second preceding vehicle 57 is not present, when the departure vehicle 58 and the own vehicle 10 establish the departure positional relationship, the automated driving control section 29a releases the departure vehicle 58 from being detected as a vehicle to be followed, and changes the travel mode from the following travel mode M1 to the constant speed travel mode M2 (step S58). Hence, the automated driving control section 29a performs the constant speed travel mode M2 (step S59). The above departure positional relationship will be described later in detail.

If the cut-in presence determination and the departure presence determination are made in step s18a, the automated driving control section 29a performs the following process at the time point when the departure positional relationship is established and which is a predetermined time point before the whole cut-in vehicle 7 enters the own lane Ln1. That is, the automated driving control section 29a performs the processes of step S30 to step S34 as in the first embodiment. Next, the automated driving control section 29a cancels detecting the departure vehicle 58 as a vehicle to be followed and changes the vehicle to be followed from the departure vehicle 58 to the cut-in vehicle 70 (step S60). That is, in step S60, regardless of presence or absence of the second preceding vehicle 57 traveling in front of the departure vehicle 58, the automated driving control section 29a changes the vehicle to be followed from the departure vehicle 58 to the cut-in vehicle 70. Hence, the automated driving control section 29 sets the cut-in vehicle 70 as a vehicle to be followed to perform the following travel mode M1 (step S62). Performing step S60 and step S62 can prevent the own vehicle 10 from unnecessarily maintaining an inter-vehicular distance to the departure vehicle 58 while decreasing the probability that the departure vehicle 58 collides with the own vehicle 10. In addition, since setting the cut-in vehicle 70 as a vehicle to be followed can be prevented from being excessively delayed, the probability that the own vehicle 10 approaches or collides with the cut-in vehicle 70 can be decreased.

A flowchart executed by the automated driving control section 29a when the rearward vehicle 56 is present (step S20 in FIG. 18: YES) will be described with reference to FIG. 20. If a cut-in presence determination and a departure absence determination are made in step S18a, the automated driving control section 29a performs a process similar to that of step S22 shown in FIG. 3. If a cut-in absence determination and a departure presence determination are made in step S18a, the automated driving control section 29a performs processes of step S52 and later shown in FIG. 19. If a cut-in presence determination and a departure presence determination are made in step S18a, the automated driving control section 29a also performs processes of step S52 and later shown in FIG. 19. As described above, if the rearward vehicle determination section 26 determines that the rearward vehicle 56 is present, the automated driving control section 29a performs automated driving of the own vehicle 10 without setting the cut-in vehicle 70 as a vehicle to be followed even if a cut-in presence determination is made. Hence, since the probability that the own vehicle 10 decelerates due to setting the cut-in vehicle 70 as a new vehicle to be followed can be decreased, the probability that the rearward vehicle 56 collides with the own vehicle 10 can be decreased.

Figure 21:
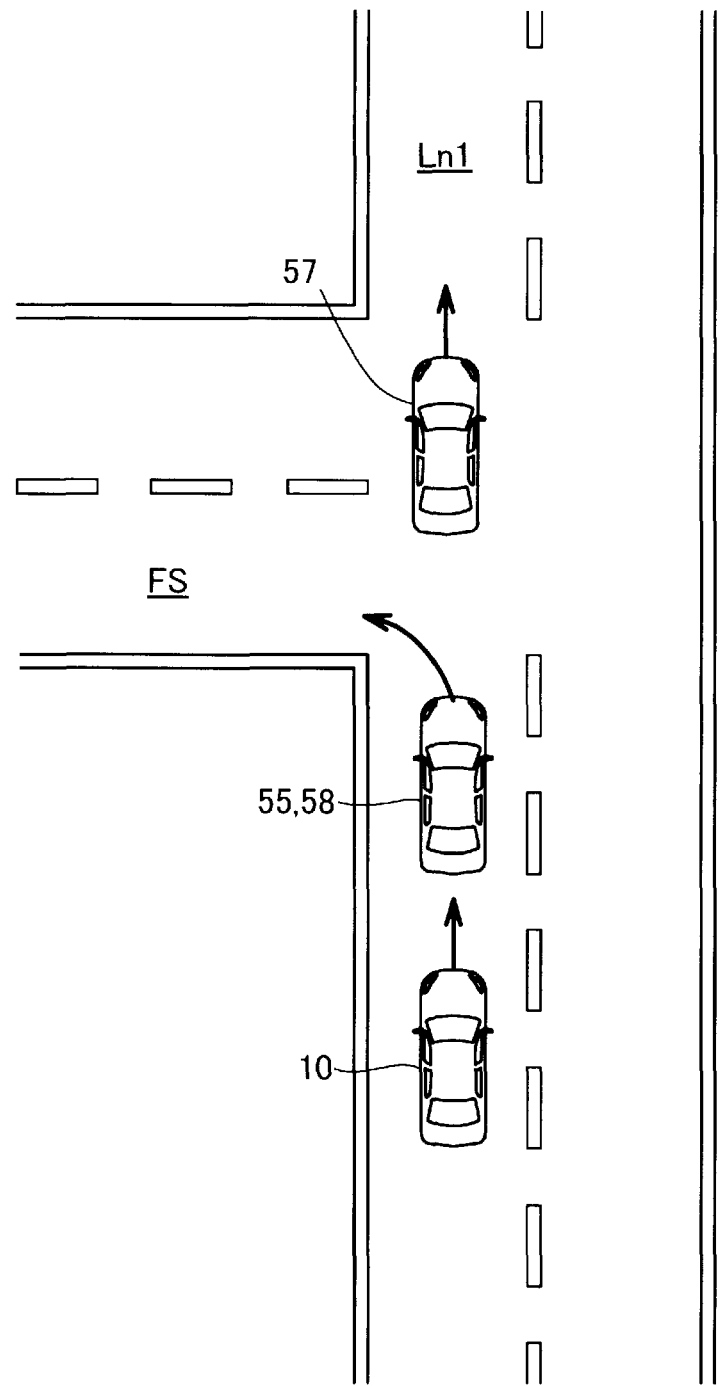
FIG. 21 is a first diagram for illustrating control performed by the vehicle control apparatus when a departure vehicle is present.
Figure 22:
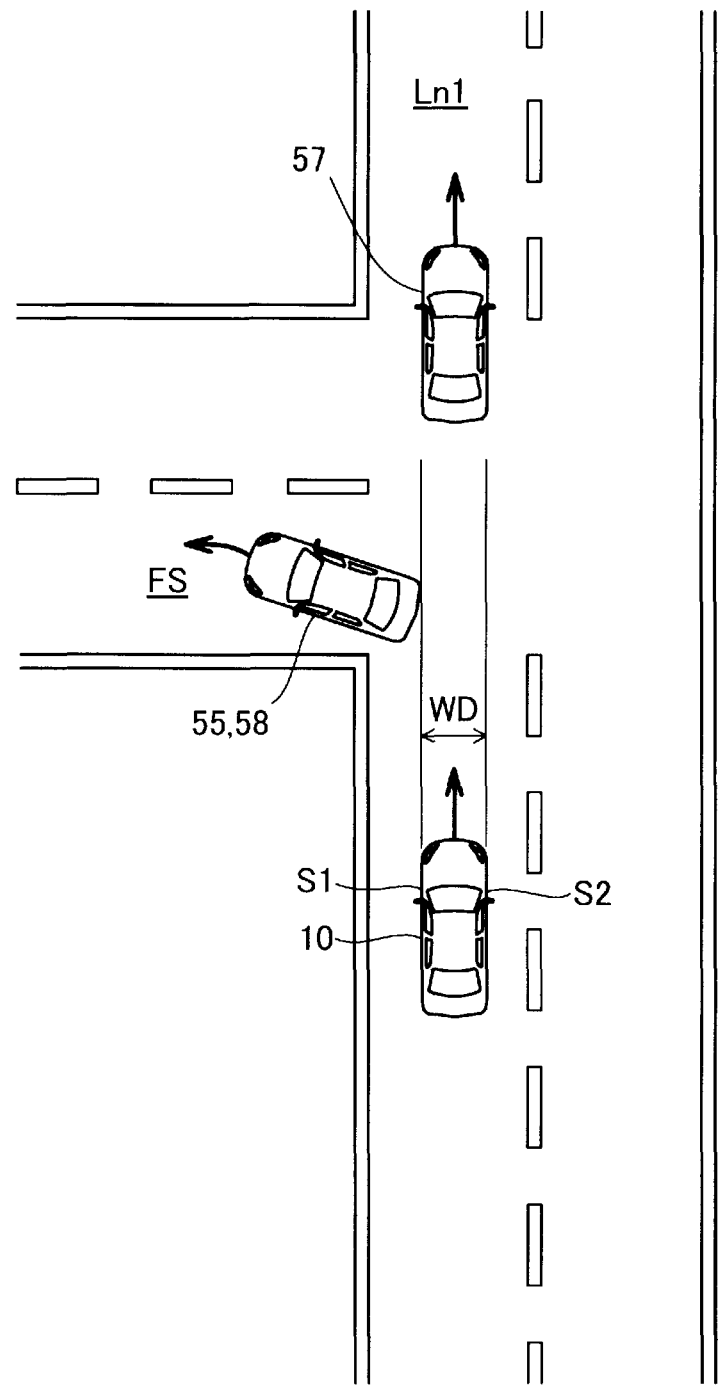
FIG. 22 is a second diagram for illustrating control performed by the vehicle control apparatus when a departure vehicle is present.

Specific examples of steps S52, S54, and S57 illustrated in FIG. 19 will be described with reference to FIG. 21 and FIG. 22. As shown in FIG. 21, when the first preceding vehicle 55 is the departure vehicle 58 and the cut-in vehicle 70 is not present, the preceding vehicle determination section 25 determines whether the second preceding vehicle 57 is present in front of the departure vehicle 58. If the second preceding vehicle 57 is present, as shown in FIG. 22, when the own vehicle 10 and the departure vehicle 58 establish a departure positional relationship, the automated driving control section 29a releases the departure vehicle 58 from being detected as a vehicle to be followed, and changes the vehicle to be followed from the departure vehicle 58 to the second preceding vehicle 57. As shown in FIG. 22, in the departure positional relationship, the departure vehicle 58 is not located between two sides S1 and S2 in the width direction WD of the own vehicle 10. When the departure positional relationship is established, the automated driving control section 29a changes the vehicle to be followed from the departure vehicle 58 to the second preceding vehicle 57, whereby the probability that the own vehicle 10 collides with the departure vehicle 58 can be decreased.

Figure 23:
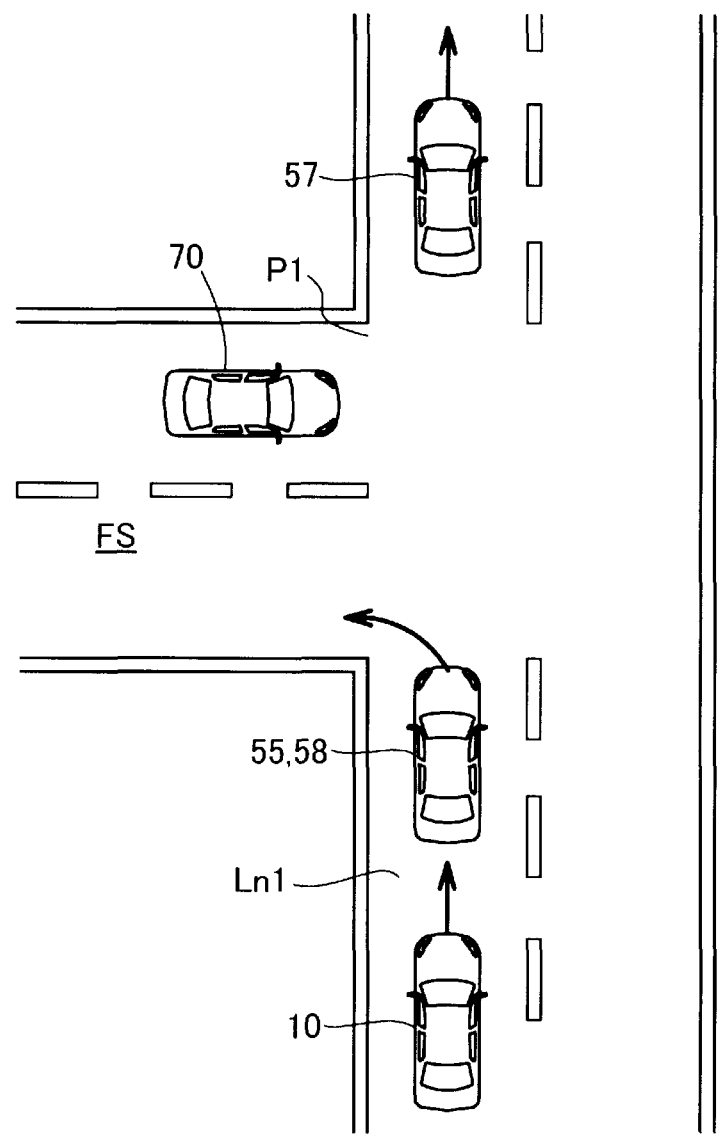
FIG. 23 is a third diagram for illustrating control performed by the vehicle control apparatus when a departure vehicle is present.
Figure 24:
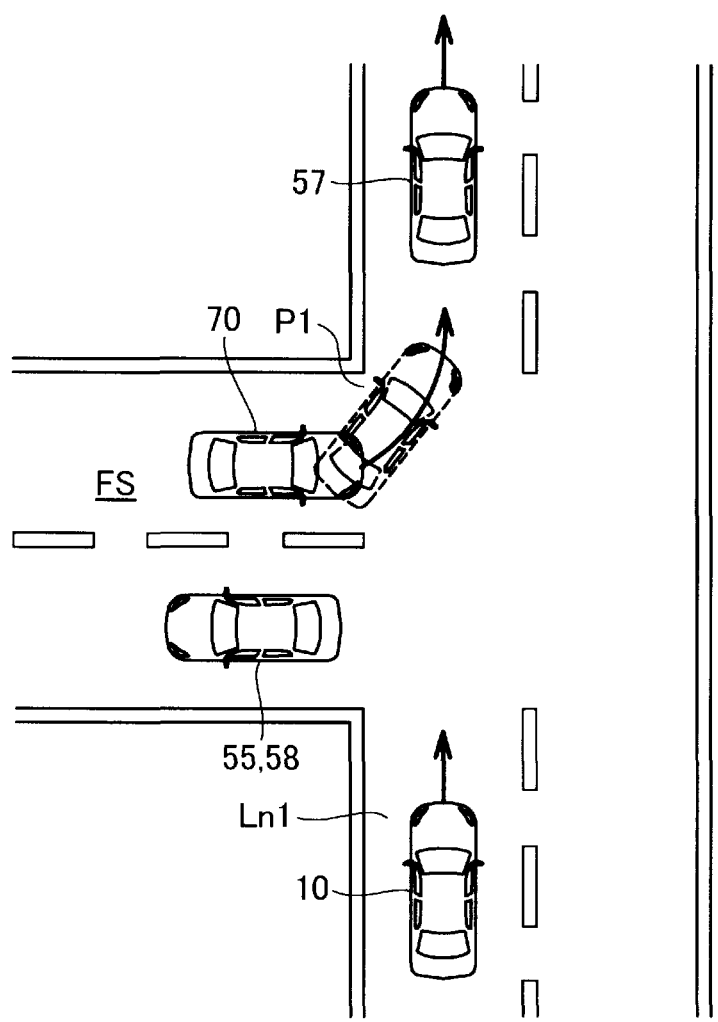
FIG. 24 is a fourth diagram for illustrating control performed by the vehicle control apparatus when a departure vehicle is present.

Specific examples of steps S60 and S62 illustrated in FIG. 19 will be described with reference to FIG. 23 and FIG. 24. As shown in FIG. 23, when the preceding vehicle 55 is the departure vehicle 58 and the cut-in vehicle 70 is present, the automated driving control section 29a performs the following at a predetermined time point when the departure positional relationship is established and before the whole cut-in vehicle 70 enters the own lane Ln1. That is, as shown in FIG. 24, the automated driving control section 29a releases the departure vehicle 58 from being detected as a vehicle to be followed, and changes the vehicle to be followed from the departure vehicle 58 to the cut-in vehicle 70 to perform the following travel mode M1. Hence, the probability that the timing at which the cut-in vehicle 70 is set as the vehicle to be followed delays can be decreased.

Figure 25:
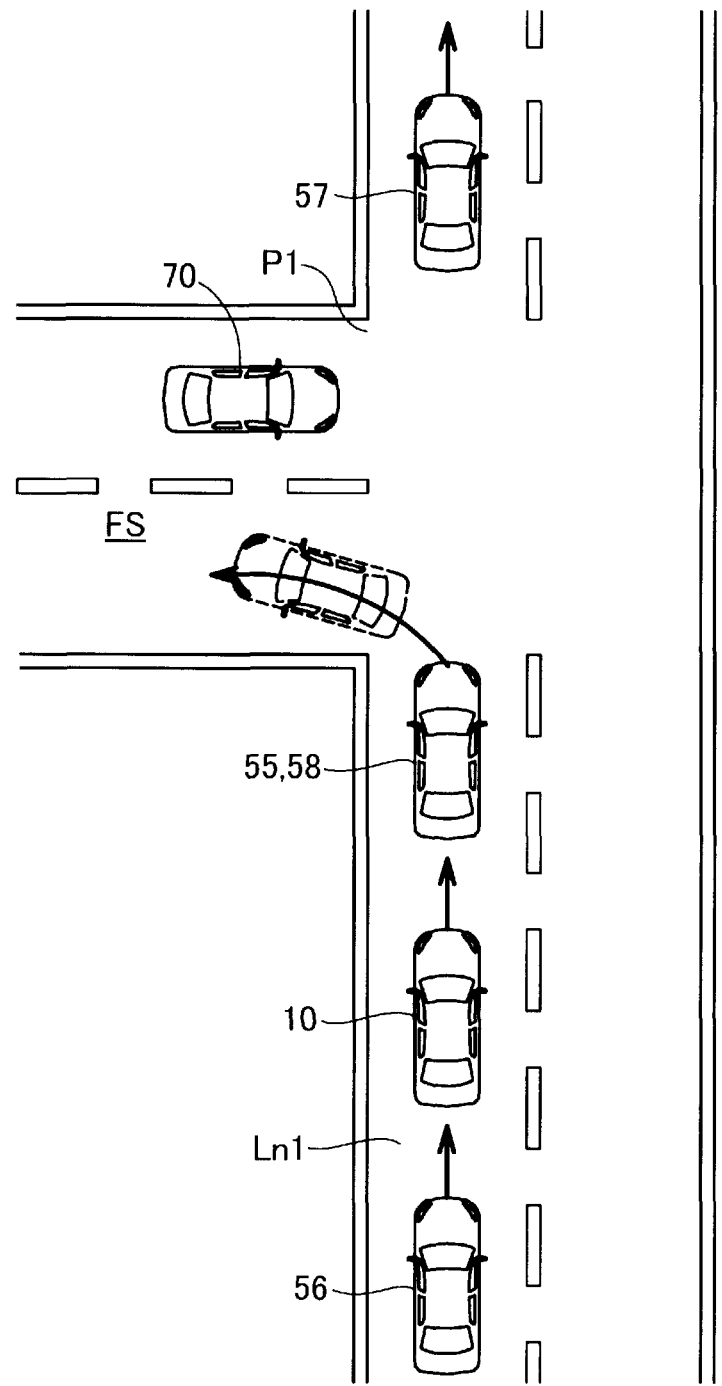
FIG. 25 is a first diagram for illustrating control performed by the vehicle control apparatus when a rearward vehicle is present in the second embodiment.
Figure 26:
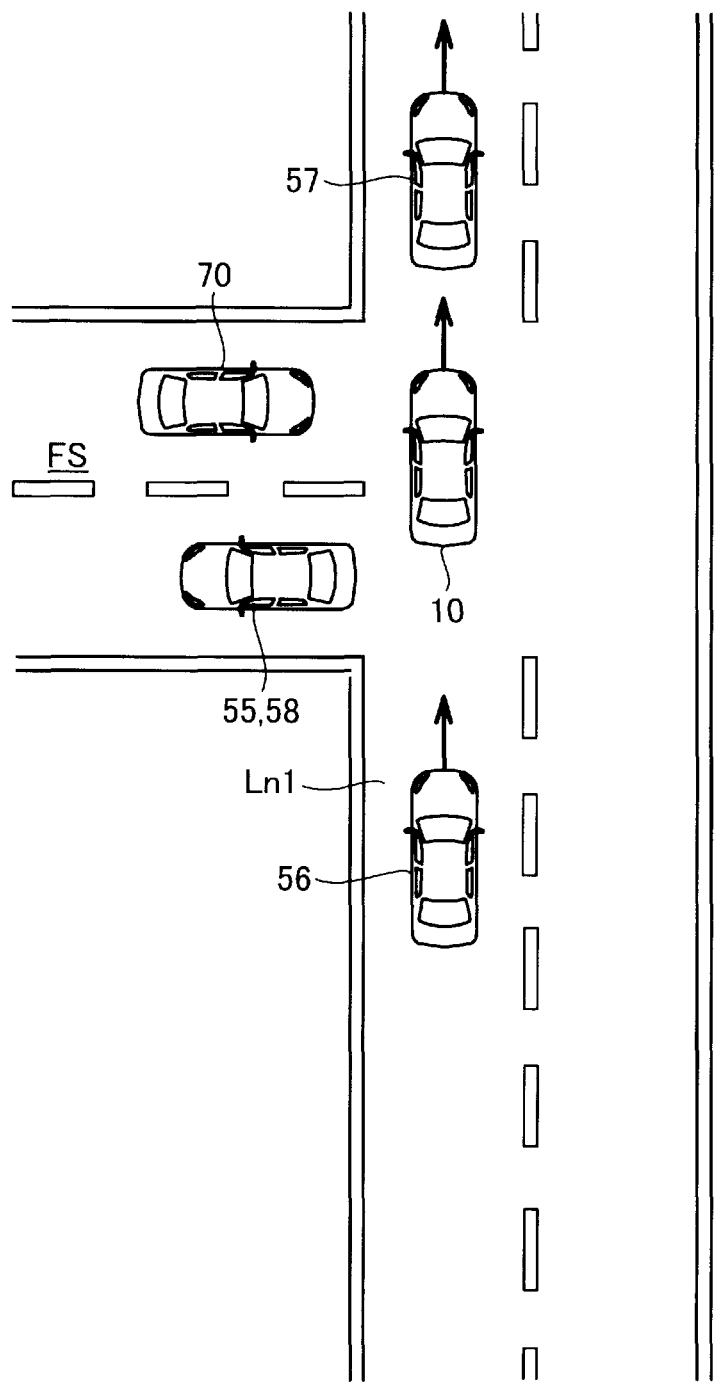
FIG. 26 is a second diagram for illustrating control performed by the vehicle control apparatus when a rearward vehicle is present in the second embodiment.

Next, specific examples of processes performed by the automated driving control section 29a when the rearward vehicle 56, the cut-in vehicle 70, and the departure vehicle 58 are present will be described with reference to FIG. 25 and FIG. 26. In FIG. 25, when the rearward vehicle 56 and the cut-in vehicle 70 are present, the automated driving control section 29a releases the departure vehicle 58 from being detected as a vehicle to be followed, and changes the vehicle to be followed from the departure vehicle 58 to the second preceding vehicle 57 (step S54). That is, the automated driving control section 29a causes the own vehicle 10 to travel while following the second preceding vehicle 57 as shown in FIG. 26 without setting he cut-in vehicle 70 as a vehicle to be followed. Hence, since the probability that the own vehicle 10 decelerates due to setting the cut-in vehicle 70 as a new vehicle to be followed can be decreased, the probability that the rearward vehicle 56 collides with the own vehicle 10 can be decreased.

According to the second embodiment, similarly to the first embodiment, the setting condition determination section 28 determines whether another vehicle traveling in front of the own vehicle 10 is set as a vehicle to be followed by a criterion different between a case in which the free space determination section 22 determines that the free space FS is present and a case in which the free space determination section 22 determines that the free space FS is not present. In the present embodiment, criterions of the vehicle to be followed by which it is determined that the free space FS is present include, in addition to the first criterion, a third criterion indicating that at least one of the cut-in vehicle 70 and the departure vehicle 58 is present. If the third criterion is fulfilled regardless of whether the first criterion is fulfilled, the automated driving control section 29a sets the cut-in vehicle 70 or the second preceding vehicle 57 as a vehicle to be followed to perform the following travel mode M1. Hence, since the criterion for determining whether the following travel mode M1 is performed can be changed between the case in which the free space FS is present and the case in which the free space FS is not present, another vehicle can be smoothly set as a vehicle to be followed.

C. THIRD EMBODIMENT

In the present embodiment, similarly to the first embodiment, a vehicle control apparatus 20b used in an area where vehicles follow the traffic regulations under which the vehicles run on left-side lanes will be described. Components similar to those of the own vehicle 1 (FIG. 1, FIG. 16) in the first embodiment or the second embodiment and steps in flowcharts similar to those in the first embodiment or the second embodiment are denoted by the same reference signs, and redundant descriptions are appropriately omitted.

Figure 27:
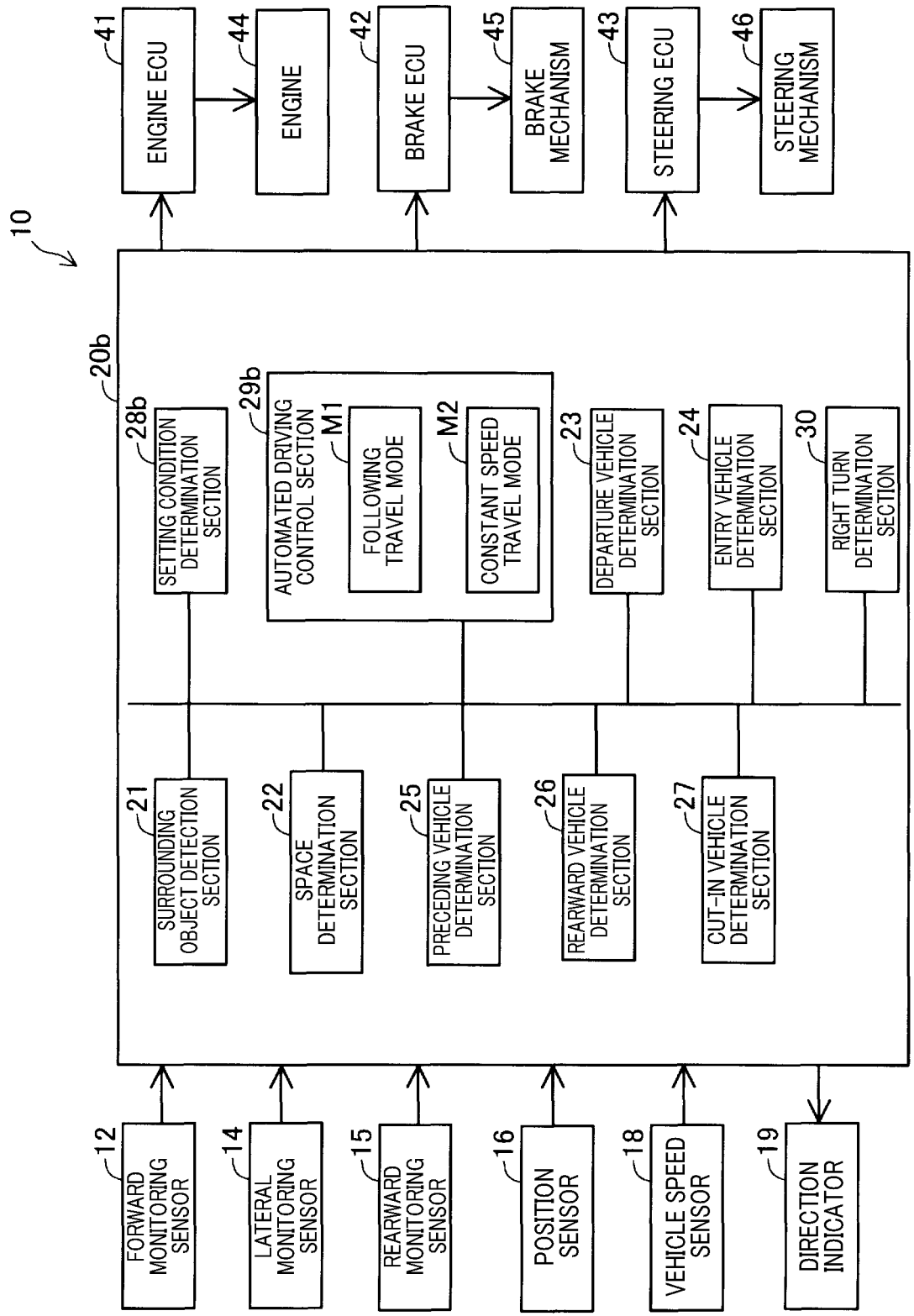
FIG. 27 is a block diagram of an own vehicle including the vehicle control apparatus according to the third embodiment.

The vehicle control apparatus 20b (FIG. 27) additionally includes an entry vehicle determination section 24 and a right turn determination section 30. The entry vehicle determination section 24 uses lane information detected by the forward monitoring sensor 12 and detection information of the surrounding object detection section 21 to determine whether an oncoming vehicle located in an opposite lane Ln2 is an oncoming entry vehicle scheduled to enter an opposite free space. As shown in FIG. 28, an opposite free space FSb is located at the opposite side of the own lane Ln1 with the opposite lane Ln2 being interposed therebetween. In the present embodiment, the opposite free space FSb is a crossing lane intersecting the own lane Ln1. If at least one of the following entry condition 1 and entry condition 2 is met, the entry vehicle determination section 24 makes an entry vehicle presence determination that oncoming vehicles 72 are present as oncoming entry vehicles 78, 79. The oncoming entry vehicle 79 is located behind the oncoming entry vehicle 78. To facilitate the understanding, the oncoming entry vehicle 78 is referred to as a first oncoming entry vehicle 78, and the oncoming entry vehicle 79 is referred to as a second oncoming entry vehicle 79.

<Entry Condition 1>

The oncoming vehicle 72 located before the opposite free space FSb is blinking a direction indicator for left turn.

<Entry Condition 2>

The oncoming vehicle 72 located before the opposite free space FSb faces the opposite free space FSb.

For the entry condition 2, any determination method can be used if it can be determined that the oncoming vehicle 72 faces the opposite free space FSb. For example, if the traveling direction of the oncoming vehicle 72 includes a direction to the opposite free space FSb and the angle of the traveling direction with respect to the direction along the own lane Ln2 is a second threshold value or more, the entry vehicle determination section 24 determines that the oncoming vehicle 72 is the first oncoming entry vehicle 78 or the second oncoming entry vehicle 79. For example, if the ratio of an image of a right side surface of the oncoming vehicle 72 to an image of the whole oncoming vehicle 72 is a predetermined threshold value or more in an image captured by the camera of the forward monitoring sensor 12, it may be determined that the oncoming vehicle 72 faces the opposite free space FSb.

In at least one of the cases where a cut-in presence determination is made, a departure presence determination is made, and an entry vehicle presence determination has been made, a setting condition determination section 28b determines that a setting condition is met.

According to an instruction from a driver input to the direction indicator 19, the right turn determination section 30 determines whether the own vehicle 10 is scheduled to turn right to enter the opposite free space FSb. Specifically, when an instruction for indicating an intention of right turn is input to the direction indicator 19 before the opposite free space FSb, the right turn determination section 30 determines that the own vehicle 10 is scheduled to enter the opposite free space FSb. If a navigation system performing route guidance to a destination based on a current location is installed in the own vehicle 10, the direction indicator 19 may provide a notification of right or left turn or lane change of the own vehicle 1, instead of by an instruction from the driver, based on guidance information of the navigation system. In this case, the right turn determination section 30 determines whether the own vehicle 10 is scheduled to turn right to enter the opposite free space FSb according to output information from the direction indicator 19 (blinking for right turn) based on the guidance information of the navigation system.

Figure 29:
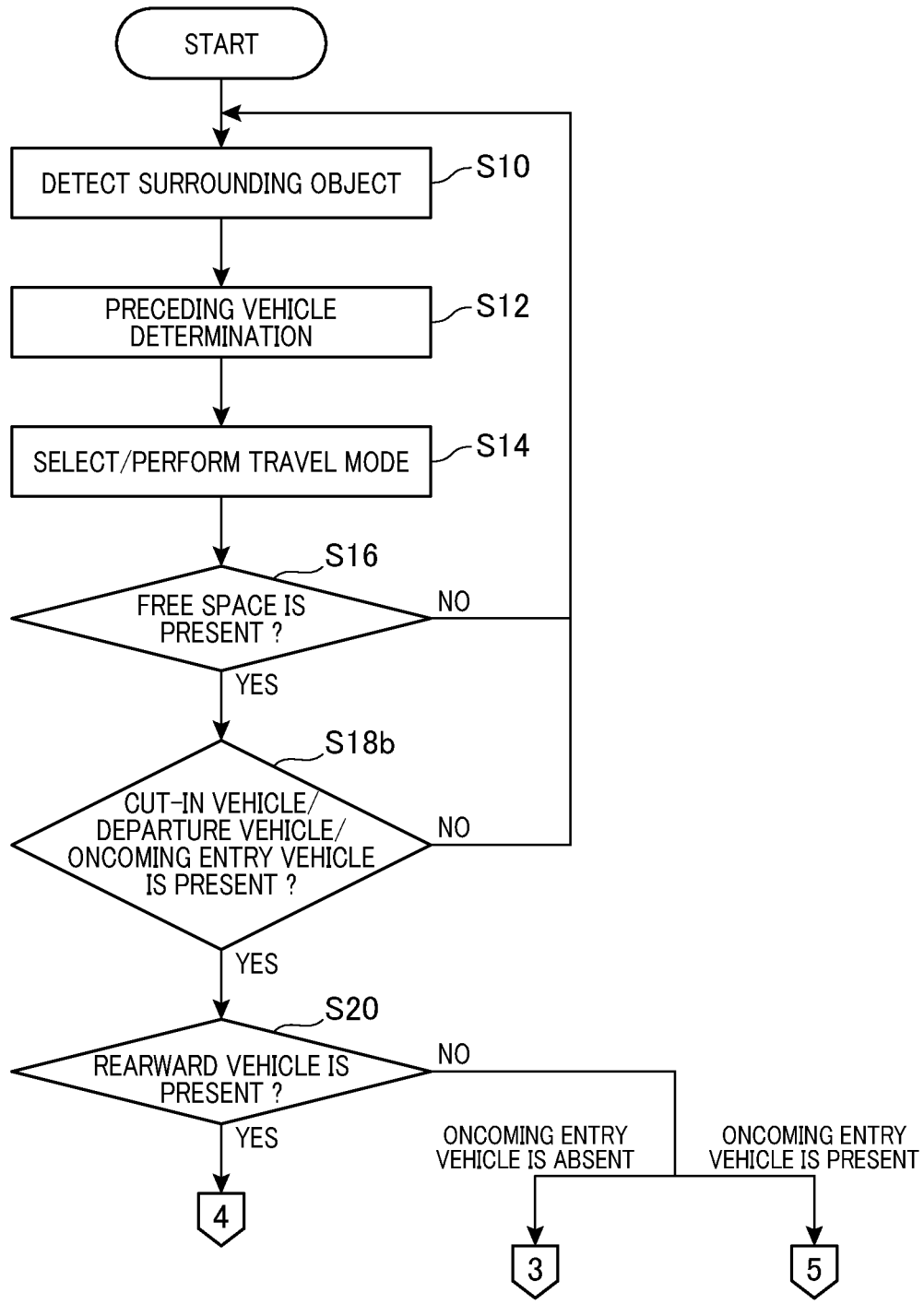
FIG. 29 is a first flowchart executed by the vehicle control apparatus according to the third embodiment.
Figure 30:
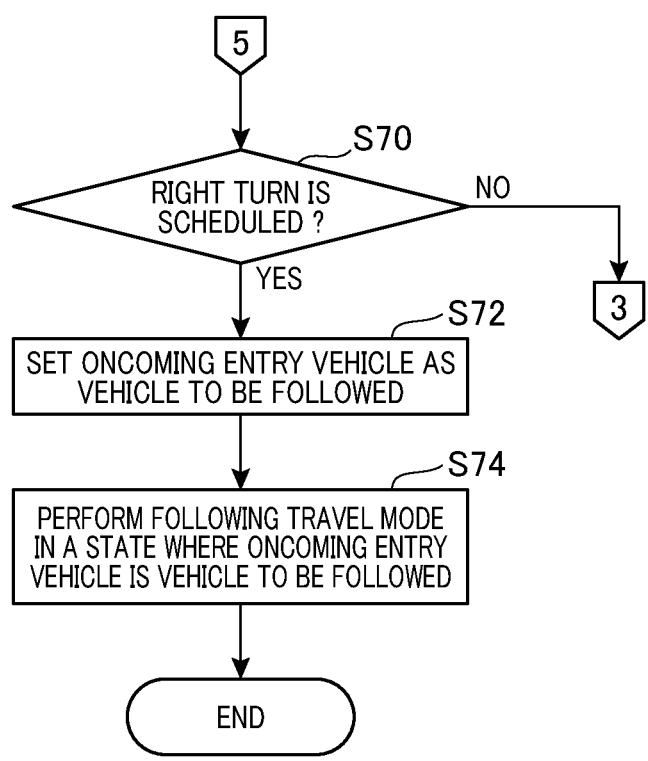
FIG. 30 is a second flowchart executed by the vehicle control apparatus according to the third embodiment.

As shown in FIG. 29, if Yes determination is made in step S16, the cut-in vehicle determination section 27, the departure vehicle determination section 23, and the entry vehicle determination section 24 determine presence or absence of the cut-in vehicle 70, the departure vehicle 58, and the oncoming entry vehicles 78, 79 (step S18b). Neither the cut-in vehicle 70, the departure vehicle 58, nor the oncoming entry vehicles 78, 79 is present, step S10 is executed again. In contrast, at least one of the cut-in vehicle 70, the departure vehicle 58, and the oncoming entry vehicles 78, 79 is present, step S20 is executed. If No determination is made in step S20, the flowchart shown in FIG. 19 or FIG. 30 is executed. If Yes determination is made in step S20, the flowchart shown in FIG. 20 is executed.

If No determination is made in step S20, if it is determined that the first oncoming entry vehicles 78 is present in step S18b, the flowchart shown in FIG. 30 is executed. First, the right turn determination section 30 determines whether the own vehicle 10 is scheduled to turn right to enter the opposite free space FSb (step S70). If the own vehicle 10 is scheduled to turn right to enter the opposite free space FSb, an automated driving control section 29b sets the first oncoming entry vehicle 78 as a vehicle to be followed (S72). Hence, the automated driving control section 29 sets the oncoming entry vehicle 78 scheduled to enter the opposite free space FSb as a vehicle to be followed to perform the following travel mode M1 (step S74). Setting the oncoming entry vehicle 78 scheduled to enter the opposite free space FSb as a vehicle to be followed can decrease the probability that the timing at which the oncoming entry vehicles 78 is detected as a vehicle to be followed is delayed. Hence, since the automated driving control section 29b can keep the set inter-vehicular distance PD in a state where the oncoming entry vehicles 78 is set as a vehicle to be followed, the own vehicle 10 can be prevented from excessively approaching and departing from the oncoming entry vehicle 78.

When, in addition to the first oncoming entry vehicle 78, the second oncoming entry vehicle 79 is present, the automated driving control section 29 sets the second oncoming entry vehicle 79 as a vehicle to be followed to perform the following travel mode M1. Hence, the automated driving control section 29b can keep the set inter-vehicular distance PD in a state where the second oncoming entry vehicle 79 is set as a vehicle to be followed. The timing of setting the oncoming entry vehicles 78 and 79 as vehicles to be followed will be described later. In contrast, when the own vehicle 10 is not scheduled to turn right to enter the opposite free space FSb or when the oncoming entry vehicle 78 is not present, the flowchart shown in FIG. 19 described in the second embodiment is executed.

Figure 31:
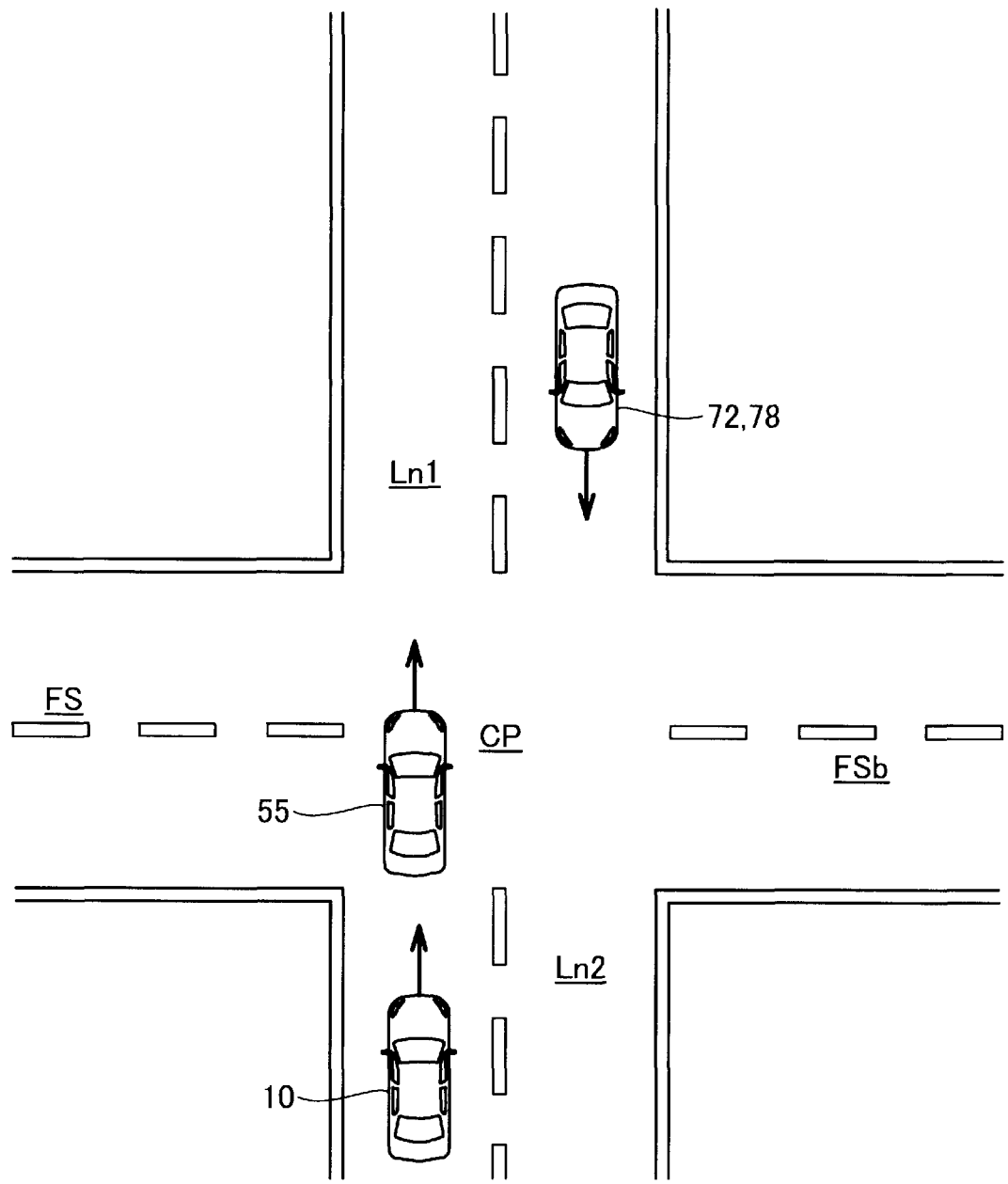
FIG. 31 is a first diagram for illustrating control performed by the vehicle control apparatus when an oncoming entry vehicle is present.
Figure 32:
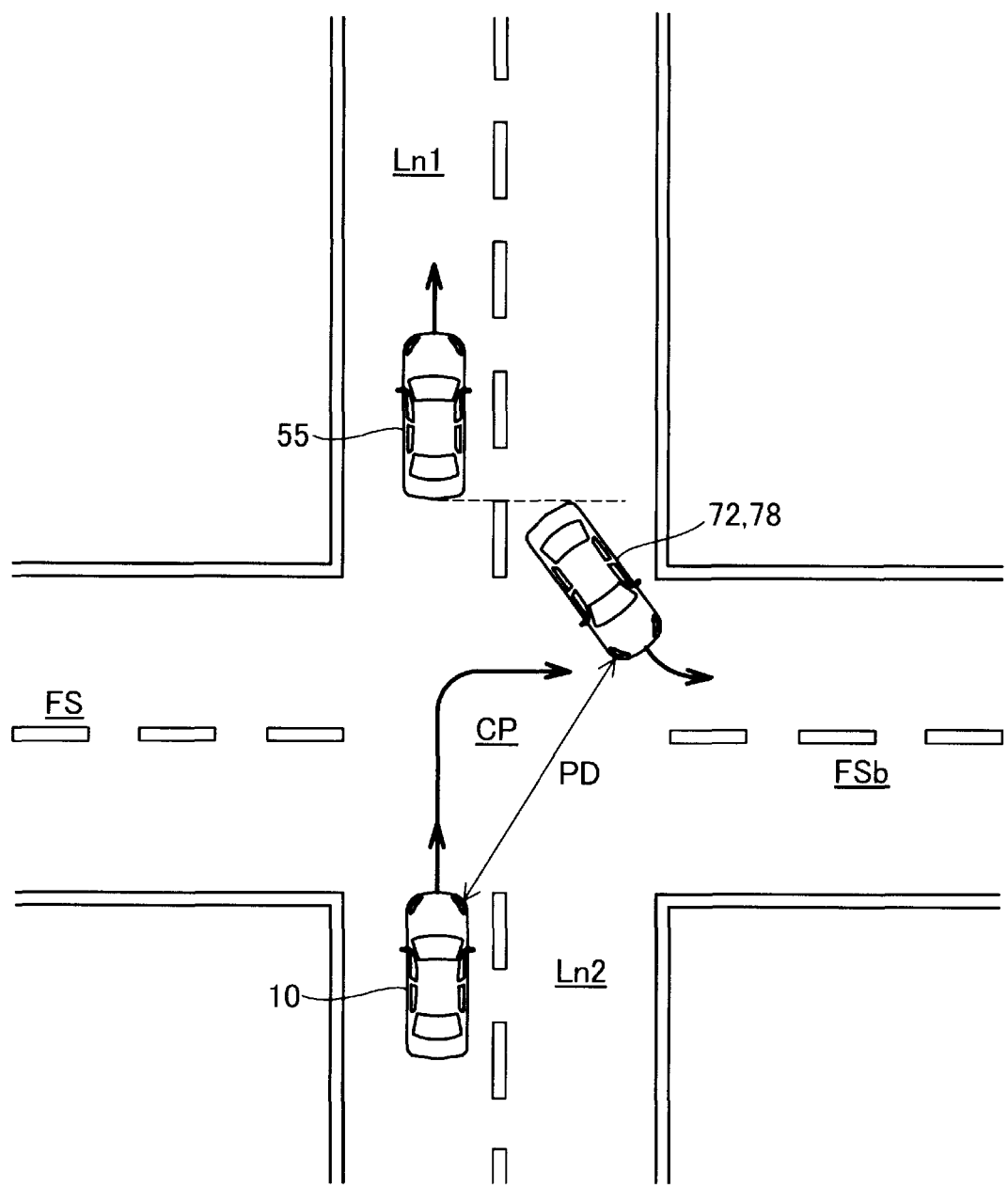
FIG. 32 is a second diagram for illustrating control performed by the vehicle control apparatus when an oncoming entry vehicle is present.

A first specific example of steps S70, S72, and S74 illustrated in FIG. 30 will be described with reference to FIG. 31 and FIG. 32. As shown in FIG. 30, in a state where the preceding vehicle 55 is set as a vehicle to be followed and the own vehicle 10 is traveling in the following travel mode M1, when the own vehicle 10 is scheduled to turn right at an intersection CP to enter the opposite free space FSb and the first oncoming entry vehicle 78 is present, the automated driving control section 29b performs the following process. That is, as shown in FIG. 32, at the time point when the rear end of the preceding vehicle 55 has located in front of the first oncoming entry vehicle 78, the automated driving control section 29b changes the vehicle to be followed from the preceding vehicle 55 to the first oncoming entry vehicle 78 to perform the following travel mode M1. When the own vehicle 10 is traveling in the constant speed travel mode M2, at the time point when the right turn determination section 30 has made a determination that the own vehicle 10 is scheduled to turn right to enter the opposite free space FSb and the entry vehicle determination section 24 has made a determination that the first oncoming entry vehicle 78 is present, the automated driving control section 29b performs the following. That is, the automated driving control section 29b sets the first oncoming entry vehicle 78 as a vehicle to be followed and changes the travel mode from the constant speed travel mode M2 to the following travel mode M1.

Figure 33:
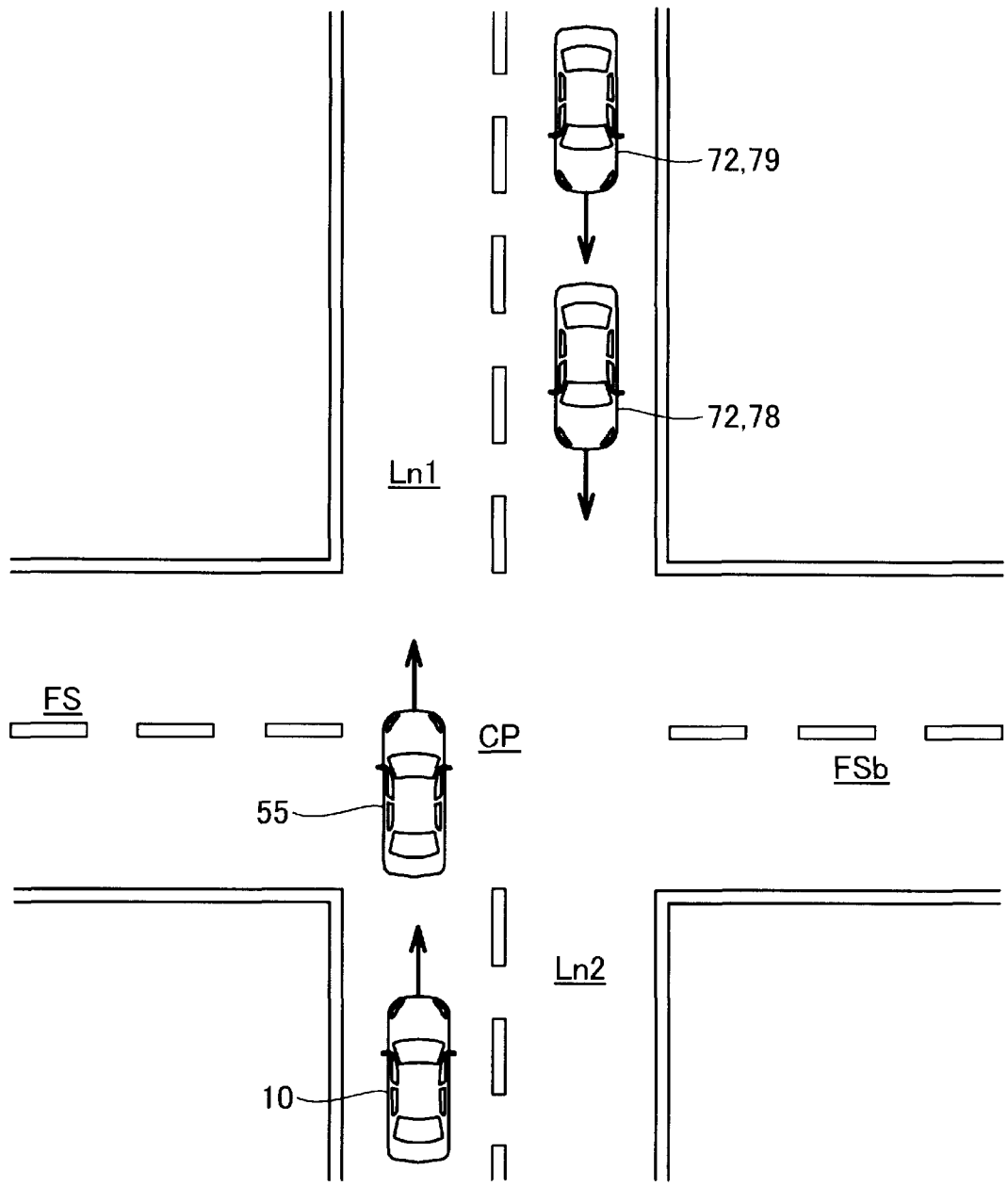
FIG. 33 is a third diagram for illustrating control performed by the vehicle control apparatus when oncoming entry vehicles are present.
Figure 34:
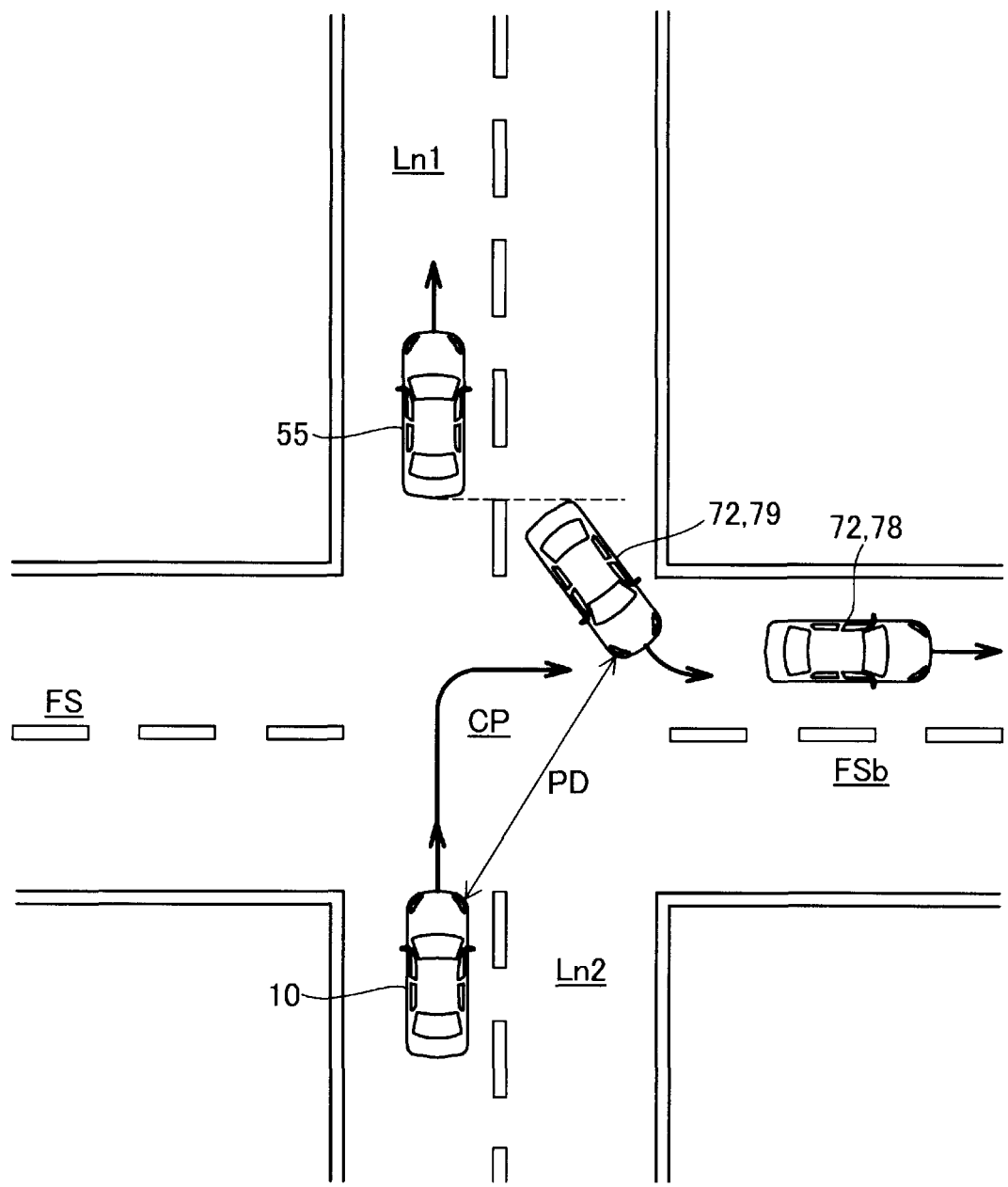
FIG. 34 is a fourth diagram for illustrating control performed by the vehicle control apparatus when oncoming entry vehicles are present.

A second specific example of steps S70, S72, and S74 illustrated in FIG. 30 will be described with reference to FIG. 33 and FIG. 34. As shown in FIG. 33, in a state where the preceding vehicle 55 is set as a vehicle to be followed and the own vehicle 10 is traveling in the following travel mode M1, when the own vehicle 10 is scheduled to turn right at the intersection CP to enter the opposite free space FSb and the first oncoming entry vehicle 78 and the second oncoming entry vehicle 79 are present, the automated driving control section 29b performs the following process. That is, as shown in FIG. 34, at the time point when the rear end of the preceding vehicle 55 has located in front of the second oncoming entry vehicle 79, the automated driving control section 29b changes the vehicle to be followed from the preceding vehicle 55 to the second oncoming entry vehicle 79 to perform the following travel mode M1. When the own vehicle 10 is traveling in the constant speed travel mode M2, at the time point when the right turn determination section 30 has made a determination that the own vehicle 10 is scheduled to enter the opposite free space FSb and the entry vehicle determination section 24 has made a determination that the first oncoming entry vehicle 78 and the second oncoming entry vehicle 79 are present, the automated driving control section 29b performs the following. That is, at the time point when the rear end of the preceding vehicle 55 has located in front of the first oncoming entry vehicle 78 and the second oncoming entry vehicle 79, the automated driving control section 29b sets the first oncoming entry vehicle 78 and the second oncoming entry vehicle 79 as vehicles to be followed and changes the travel mode from the constant speed travel mode M2 to the following travel mode M1. As described above, when a continuance presence determination that the first oncoming entry vehicle 78 and the second oncoming entry vehicle 79 are present is made, the automated driving control section 29b sets the first oncoming entry vehicle 78 and the second oncoming entry vehicle 79 scheduled to enter the opposite free space FSb as vehicles to be followed with smooth change to perform the following travel mode M1. For example, the automated driving control section 29b first sets the first oncoming entry vehicle 78 as a vehicle to be followed to perform the following travel mode M1. The, at the time point when the shortest distance between the own vehicle 10 and the second oncoming entry vehicle 79 has become shorter than the shortest distance between the own vehicle 10 and the first oncoming entry vehicle 78, the automated driving control section 29b changes the vehicle to be followed from the first oncoming entry vehicle 78 to the second oncoming entry vehicle 79 to perform the following travel mode M1.

D. OTHER EMBODIMENTS

D-1. Another Embodiment 1

Figure 35:
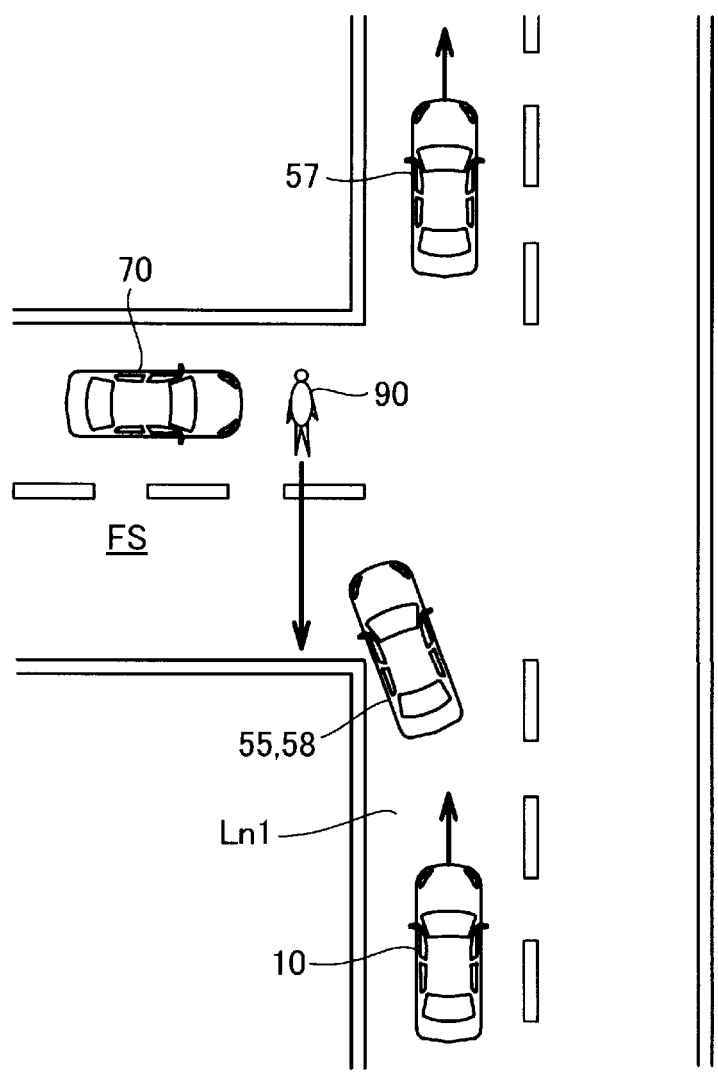
FIG. 35 is a diagram for illustrating control performed by the vehicle control apparatus when a crossing object is present.

In the second to third embodiments, if a departure presence determination is made, when a positional relationship in which the departure vehicle 58 is not located between the two sides of the own vehicle 10 in the width direction WD of the own vehicle 10, the automated driving control sections 29a and 29b cancel detecting the departure vehicle 58 as a vehicle to be followed. However, if a predetermined positional relationship is established by which it can be determined that the departure vehicle 58 and the own vehicle 10 are unlikely to collide with each other, the positional relationship is not limited. For example, the automated driving control sections 29a and 29b may cancel detecting the departure vehicle 58 as a vehicle to be followed at the time point when a positional relationship is established in which the cut-in vehicle 70 is located on the free space FS side (left side) with respect to the center of the own vehicle 10. As shown in FIG. 35, when an object 90 (e.g., a pedestrian or a bicycle) crossing the free space FS is present, even if the above predetermined positional relationship is established, the following process may be performed. That is, the automated driving control sections 29a and 29b do not cancel detecting the departure vehicle 58 as a vehicle to be followed even if the predetermined positional relationship is established, but the automated driving control sections 29a and 29b cancel detecting the departure vehicle 58 as a vehicle to be followed at the time point when the crossing object 90 disappears from the free space FS. Hence, while the departure vehicle 58 is stopped considering the crossing object 90, the probability that detecting the departure vehicle 58 as a vehicle to be followed is canceled can be decreased. Hence, the probability that the departure vehicle 58 collides with the own vehicle 10 can be decreased.

D-2. Another Embodiment 2

In the above embodiment, when the rearward vehicle 56 is located behind the own vehicle 10, the rearward vehicle determination section 26 determines that the rearward vehicle 56 is present. However, the determination method for the rearward vehicle 56 is not limited to this. For example, if the rearward vehicle 56 is located behind the own vehicle 10 and a time-to-collision TTC between the own vehicle 10 and the rearward vehicle 56 is a predetermined value or less, the rearward vehicle determination section 26 may determine that the rearward vehicle 56 is present. The time-to-collision TTC means a time period by the end of which the rearward vehicle 56 travels at a current relative speed V and reaches the own vehicle 10 in a case where the inter-vehicular distance between the own vehicle 10 and the rearward vehicle 56 is D, and is obtained by TTC=D/V. In the above embodiments, the rearward vehicle determination section 26 may be omitted. In this case, even when a rearward vehicle is present, the flowchart in the case where no rearward vehicles are present described in the above embodiments is executed.

D-3. Another Embodiment 3

In the second embodiment, the vehicle control apparatus 20a may not include the cut-in vehicle determination section 27. In this case, the vehicle control apparatus 20a may execute step S52 and later shown in FIG. 19 regardless of presence or absence of the cut-in vehicle 70. In the third embodiment, the vehicle control apparatus 20b may include at least one of the cut-in vehicle determination section 27 and the departure vehicle determination section 23.

D-4. Another Embodiment 4

In the above embodiments, the vehicle control apparatuses 20, 20a, 20b used in an area where vehicles follow the traffic regulations under which the vehicles run on left-side lanes are described. However, the vehicle control apparatuses 20, 20a, 20b may be used in an area where vehicles follow the traffic regulations under which the vehicles run on right-side lanes. In this case, right and left in the above embodiments are reversed. For example, in the third embodiment, the oncoming entry vehicles 78, 79 are scheduled to turn right to enter the opposite free space FSb. The right turn determination section 30 functions as a left turn determination section that determines whether the own vehicle 10 is scheduled to turn left to enter the opposite free space FSb.

The present disclosure is not limited to the above-described embodiments, examples, and modifications and can be implemented with various configurations within a scope not deviating from the gist of the present disclosure. For example, technical features in the above-described embodiments, examples, and modifications can be replaced or combined as appropriate to solve part or all of the above-described problems to be solved or to achieve part or all of the above-described effects. Further, the technical features, which are not described as essential features in the present specification, can be deleted as appropriate.

As an aspect of the present disclosure, a vehicle control apparatus (20, 20a) is provided which performs a following travel mode (M1) in which an own vehicle (10) is caused to travel while following a vehicle to be followed located in front of the own vehicle. The vehicle control apparatus includes: a surrounding object detection section (21) that acquires detection information regarding a surrounding object located around the own vehicle; a space determination section (22) that uses the detection information acquired by the surrounding object detection section to determine presence or absence of a free space (FS), in which a vehicle is allowed to travel, located laterally to an own lane (Ln1) in which the own vehicle travels; a setting condition determination section (28, 28a) that determines whether a first other vehicle (70) that is another vehicle and has entered the own lane from the free space or a second other vehicle (57) that is the another vehicle and travels, in the own vehicle, in front of a preceding vehicle that has entered the free space from the own lane meets a setting condition for setting the first other vehicle or the second other vehicle as the vehicle to be followed; and an automated driving control section (29, 29a) that sets the another vehicle as the vehicle to be followed to perform the following travel mode if the setting condition determination section determines that the setting condition is met.

According to the above vehicle control apparatus, another vehicle is set as a vehicle to be followed to perform the following travel mode if the setting condition determination section determines that the setting condition for setting another as a vehicle to be followed is met. Hence, the vehicle control apparatus can smoothly perform the following travel mode with respect to another vehicle set as a vehicle to be followed.

The present disclosure can be implemented by various embodiments of a vehicle control apparatus. The present disclosure can be implemented by embodiments such as a control method for the vehicle control apparatus, a program for allowing a computer to execute the control method, and a vehicle in which the vehicle control apparatus is installed.

What is claimed is:

1. A vehicle control apparatus that performs a following travel mode in which an own vehicle is caused to travel while following a vehicle to be followed located in front of the own vehicle, the apparatus comprising:
   a surrounding object detection section that comprises at least one of an image sensor, a radio wave sensor, a lidar, and a sound wave sensor for monitoring a surrounding of the own vehicle, and uses a monitored result of the at least one of the image sensor, radio wave sensor, lidar, and sound wave sensor to acquire detection information regarding a surrounding object located around the own vehicle;
   a space determination section that uses the detection information acquired by the surrounding object detection section to determine presence or absence of a free space, in whicha the own vehicle is allowed to travel, located laterally to an own lane in which the own vehicle travels,
   the free space intersecting the own lane and being a space
      (i) from which an entering vehicle is enabled to enter into the own lane and (ii) into which the own vehicle exiting from the own lane is enabled to enter;

a setting condition determination section that determines whether (i) a first other vehicle has entered the own lane from the free space, or (ii) a second other vehicle that travels in the own lane in front of a preceding vehicle that will enter the free space from the own lane, meets a setting condition for setting the first other vehicle or the second other vehicle as the vehicle to be followed, the setting condition for the first other vehicle including:

a first condition that the first other vehicle located in the free space is blinking a turn direction indicator for a turn in a direction of travel of the own vehicle; and a second condition that the first other vehicle located in the free space is stopped in a vicinity of an exit of the free space and is not blinking a turn direction indicator for a turn in a direction opposite to the direction of travel of the own vehicle, the setting condition for the second other vehicle including a third condition that (i) the preceding vehicle is determined to enter from the own lane into the free space, (ii) the second other vehicle is traveling in front of the preceding vehicle, and (iii) a positional relationship of the own vehicle with respect to the preceding vehicle becomes a predetermined departure positional relationship; and an automated driving control section that:

sets the first other vehicle as the vehicle to be followed to perform the following travel mode when the first or second condition for the first other vehicle is met before the first other vehicle cuts in a space in front of the own vehicle;

sets the second other vehicle as the vehicle to be followed to perform the following travel mode when the third condition for the second other vehicle is met before the preceding vehicle departs from the own lane into the free space; and controls the own vehicle to perform the following travel mode.

2. The vehicle control apparatus according to claim 1, further comprising a cut-in vehicle determination section that uses the detection information acquired by the surrounding object detection section to determine presence or absence of a cut-in vehicle that is the first other vehicle and cuts in a space in front of the own vehicle from the free space, wherein the setting condition includes a determination by the cut-in vehicle determination section, and when the cut-in vehicle determination section determines that the cut-in vehicle is present, the automated driving control section sets the cut-in vehicle as the vehicle to be followed to perform the following travel mode.

3. The vehicle control apparatus according to claim 2, wherein when the own vehicle is performing the following travel mode in which the own vehicle follows the preceding vehicle located in front of the own vehicle and when the cut-in vehicle determination section has determined that the cut-in vehicle is present, the automated driving control section changes the vehicle to be followed from the preceding vehicle to the cut-in vehicle at a predetermined time point before the whole cut-in vehicle enters the own lane to set the cut-in vehicle as the vehicle to be followed.

4. The vehicle control apparatus according to claim 3, wherein when the own vehicle is caused to travel in the following travel mode in which the own vehicle follows the preceding vehicle and when the cut-in vehicle determination section has determined that the cut-in vehicle is present, the automated driving control section controls the own vehicle so that an inter-vehicular distance between the own vehicle and the preceding vehicle is longer than a predetermined set inter-vehicular distance, and then changes the vehicle to be followed from the preceding vehicle to the cut-in vehicle.

5. The vehicle control apparatus according to claim 3, wherein when the following travel mode in which the own vehicle follows the preceding vehicle is being performed and the own vehicle is stopped due to stop of the preceding vehicle, and when the cut-in vehicle determination section has determined that the cut-in vehicle is present, the automated driving control section changes the vehicle to be followed from the preceding vehicle to the cut-in vehicle after stop of the own vehicle is maintained even when the preceding vehicle starts traveling.

6. The vehicle control apparatus according to claim 2, wherein the automated driving control section further performs a constant speed travel mode in which the own vehicle is caused to travel at a predetermined set vehicle speed, when the constant speed travel mode is being performed and when the cut-in vehicle determination section has determined that the cut-in vehicle is present, the automated driving control section sets the cut-in vehicle as the vehicle to be followed at a time point before the whole cut-in vehicle enters the own lane to change a travel mode from the constant speed travel mode to the following travel mode.

7. The vehicle control apparatus according to claim 2, further comprising a rearward vehicle determination section that uses the detection information acquired by the surrounding object detection section to determine presence or absence of a rearward vehicle located behind the own vehicle in the own lane, wherein when the rearward vehicle determination section determines that the rearward vehicle is present, even when the cut-in vehicle determination section determines that the cut-in vehicle is present, the automated driving control section performs automated driving of the own vehicle without setting the cut-in vehicle as the vehicle to be followed.

8. The vehicle control apparatus according to claim 1, further comprising a departure vehicle determination section that uses the detection information acquired by the surrounding object detection section to determine whether a first preceding vehicle that is the preceding vehicle as the vehicle to be followed that is followed in the following travel mode is a departure vehicle that departs from the own lane to enter the free space, wherein the setting condition includes a determination by the departure vehicle determination section, and when the departure vehicle determination section determines that the departure vehicle is present and a second preceding vehicle that is the second other vehicle that travels in front of the departure vehicle is present, when a predetermined positional relationship is established by which it is determined that the departure vehicle and the own vehicle are unlikely to collide with each other, the automated driving control section changes the vehicle to be followed from the departure vehicle to the second preceding vehicle to set the second preceding vehicle as the vehicle to be followed.

9. The vehicle control apparatus according to claim 8, further comprising a cut-in vehicle determination section that uses the detection information acquired by the surrounding object detection section to determine presence or absence of a cut-in vehicle that is the first other vehicle and cuts in a space in front of the own vehicle from the free space, wherein
- the setting condition includes a determination by the cut-in vehicle determination section,
- when the cut-in vehicle determination section determines that the cut-in vehicle is present, the automated driving control section sets the cut-in vehicle as the vehicle to be followed to perform the following travel mode,
- when the own vehicle is performing the following travel mode in which the own vehicle follows the preceding vehicle located in front of the own vehicle and if the cut-in vehicle determination section has determined that the cut-in vehicle is present, the automated driving control section changes the vehicle to be followed from the preceding vehicle to the cut-in vehicle at a predetermined time point before the whole cut-in vehicle enters the own lane to set the cut-in vehicle as the vehicle to be followed, and
- when the cut-in vehicle determination section determines that the cut-in vehicle is present and when the departure vehicle determination section determines that the departure vehicle is present, the automated driving control section changes the vehicle to be followed from the departure vehicle to the cut-in vehicle at a time point when the departure positional relationship between the departure vehicle and the own vehicle is established and which is the predetermined time point, regardless of presence or absence of the second preceding vehicle.

10. The vehicle control apparatus according to claim 8, wherein
- in the positional relationship, the departure vehicle is not located between two sides of the own vehicle in a width direction of the own vehicle.

* * * * *